(12) United States Patent
Iacobucci

(10) Patent No.: US 9,854,912 B2
(45) Date of Patent: Jan. 2, 2018

(54) RECLINING CHAIR WITH FULLY RECLINED BED POSITION

(75) Inventor: Lucio Iacobucci, Rome (IT)

(73) Assignee: IACOBUCCI HF ELECTRONICS S.P.A., Ferentino (IT)

( * ) Notice: Subject to any disclaimer, the term of this patent is extended or adjusted under 35 U.S.C. 154(b) by 455 days.

(21) Appl. No.: 13/880,571

(22) PCT Filed: Oct. 19, 2011

(86) PCT No.: PCT/IT2011/000351
§ 371 (c)(1),
(2), (4) Date: May 22, 2013

(87) PCT Pub. No.: WO2012/053022
PCT Pub. Date: Apr. 26, 2012

(65) Prior Publication Data
US 2014/0159436 A1 Jun. 12, 2014

(30) Foreign Application Priority Data

Oct. 19, 2010 (IT) .............................. RM2010A0558

(51) Int. Cl.
*A47C 1/034* (2006.01)
*B60N 2/20* (2006.01)
(Continued)

(52) U.S. Cl.
CPC .............. *A47C 1/0342* (2013.01); *B60N 2/06* (2013.01); *B60N 2/14* (2013.01); *B60N 2/20* (2013.01);
(Continued)

(58) Field of Classification Search
CPC .............. A47C 1/0342; A47C 17/1753; A47C 17/1756; B64D 11/0641
(Continued)

(56) References Cited

U.S. PATENT DOCUMENTS 4,637,652 A 1/1987 Bergenwall
5,788,183 A * 8/1998 Marechal ................ B60N 2/34
105/316

(Continued)

FOREIGN PATENT DOCUMENTS

EP 0957025 A2 11/1999
EP 1878608 A2 1/2008
(Continued)

OTHER PUBLICATIONS

Wojski, Guadlupe, Search Report and Written Opinion, PCT/IT2011/000351, European Patent Office, dated Feb. 24, 2012.

*Primary Examiner* — David R Dunn
*Assistant Examiner* — Tania Abraham
(74) *Attorney, Agent, or Firm* — Greer, Burns & Crain, Ltd.; Gregory P. Einhorn

(57) ABSTRACT

The reclining chair 100 according to the invention comprises an anchoring structure 200 having, mounted thereon, a support structure or frame 300A which forms a support of a seat 300B connected at the front to a leg rest 600, the frame 300A being connected laterally to two arm rests 500 and at the rear to a backrest 400. The backrest and frame are connected together by means of frame pins 316; the backrest and seat 300B are connected together by means of lever systems 410, 410a connected at one end to seats 407 provided on the framework 401 of the backrest 400 and at the other end to pins arranged in seats 323 on the seat side support structures 311 of the seat 300B; the frame 300A and seat 300B are connected together by means of frame pins 306 and 318 which slide inside corresponding recesses 320 and 321 formed in the seat side support structures 311 of the seat 300B.

24 Claims, 24 Drawing Sheets

(51) Int. Cl.
*B60N 2/06* (2006.01)
*B60N 2/14* (2006.01)
*B60N 2/34* (2006.01)
*B60N 2/44* (2006.01)
*B60N 2/46* (2006.01)
*B60R 7/04* (2006.01)

(52) U.S. Cl.
CPC ............ *B60N 2/34* (2013.01); *B60N 2/4495* (2013.01); *B60N 2/464* (2013.01); *B60N 2/4606* (2013.01); *B60R 7/043* (2013.01)

(58) Field of Classification Search
USPC .............................................. 297/75, 354.13
See application file for complete search history.

(56) References Cited

U.S. PATENT DOCUMENTS

| | | | |
|---|---|---|---|
| 6,170,786 B1* | 1/2001 | Park | B60N 2/0232 248/274.1 |
| 6,227,489 B1* | 5/2001 | Kitamoto | B64D 11/00 244/118.5 |
| 6,276,635 B1* | 8/2001 | Ferry | A47C 1/0352 105/316 |
| 6,412,870 B1* | 7/2002 | Higgins et al. | 297/342 |
| 6,494,536 B2* | 12/2002 | Plant | 297/284.11 |
| 6,688,691 B2* | 2/2004 | Marechal et al. | 297/317 |
| 6,692,069 B2* | 2/2004 | Beroth et al. | 297/118 |
| 6,846,042 B2* | 1/2005 | Hanson et al. | 297/411.36 |
| 6,871,120 B1* | 3/2005 | Nivet | B60N 2/0224 297/154 |
| 6,929,320 B2* | 8/2005 | Laurent | 297/83 |
| 7,178,871 B1* | 2/2007 | Round | B60N 2/242 297/217.3 |
| 7,427,106 B2* | 9/2008 | Williamson et al. | 297/337 |
| 7,665,693 B2* | 2/2010 | Bettell | B64D 11/06 244/118.5 |
| 2001/0000639 A1* | 5/2001 | Park | A47C 1/0352 297/411.3 |
| 2005/0168042 A1 | 8/2005 | Williamson et al. | |
| 2007/0262625 A1 | 11/2007 | Dryburgh et al. | |
| 2008/0315643 A1 | 12/2008 | Beroth et al. | |
| 2010/0032994 A1* | 2/2010 | Lawson | B64D 11/06 297/86 |
| 2012/0038196 A1* | 2/2012 | Lawson | B64D 11/06 297/354.13 |
| 2012/0074751 A1* | 3/2012 | De La Garza | B64D 11/06 297/354.13 |

FOREIGN PATENT DOCUMENTS

| | | |
|---|---|---|
| JP | 58000427 A | 1/1983 |
| WO | 2002096700 A1 | 12/2002 |
| WO | 2007072045 A2 | 6/2007 |
| WO | 2008107689 A1 | 9/2008 |

* cited by examiner

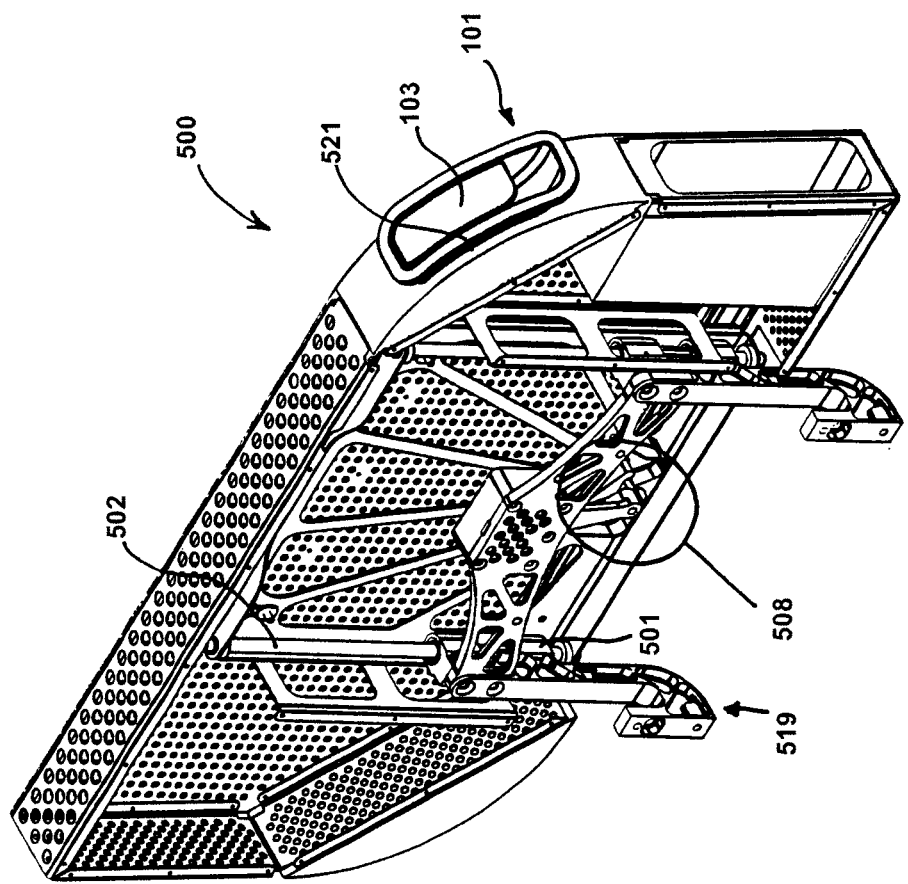
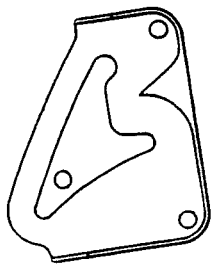
Fig. 15a
Fig. 15b

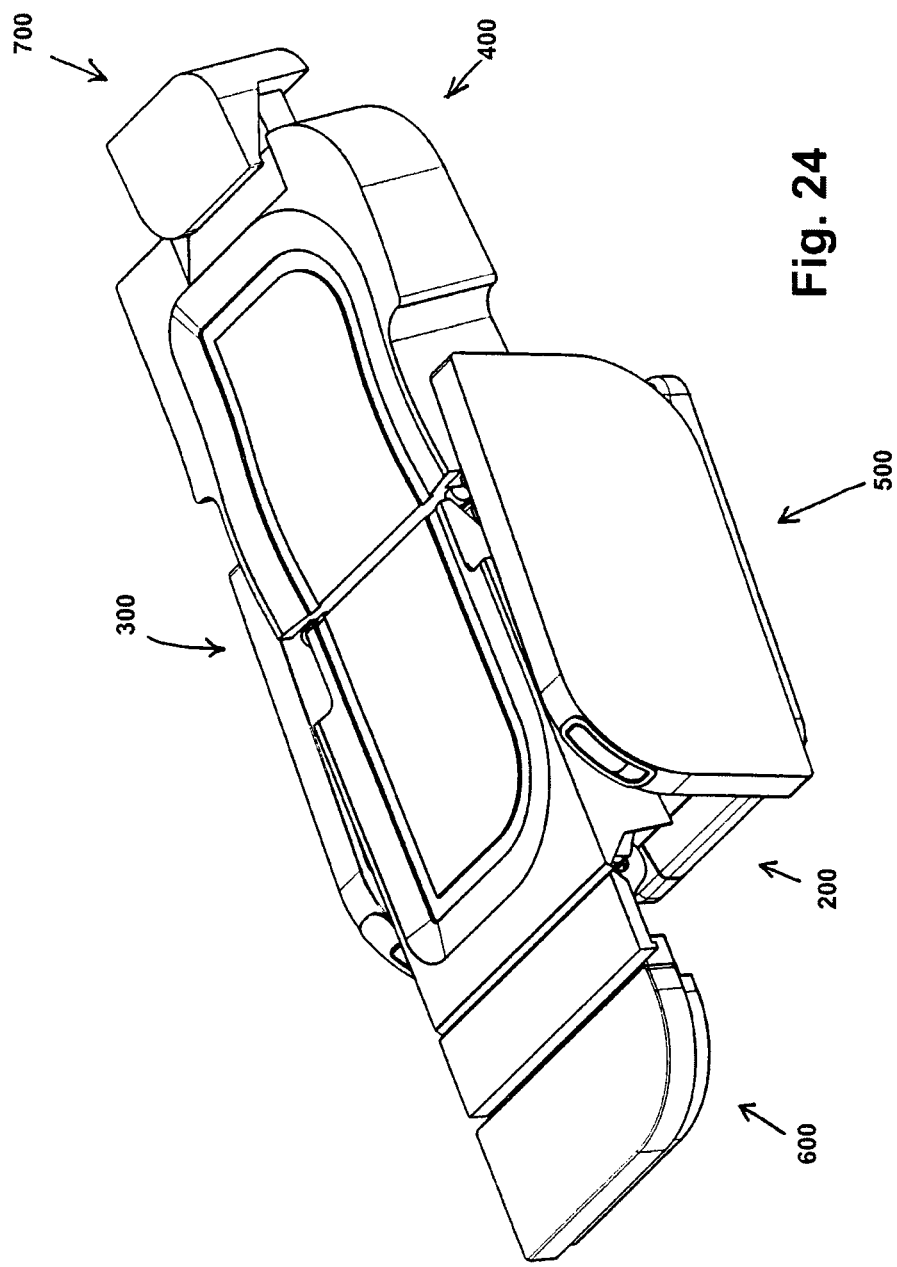

RECLINING CHAIR WITH FULLY RECLINED BED POSITION

FIELD OF THE INVENTION

The present invention relates to a reclining chair, in particular suitable for moving environments, such as tyred, wheeled or rail vehicles, aircrafts, floating crafts and mobile homes.

PRIOR ART

In order to ensure the sitting comfort of reclining chairs in vehicles generally chairs with a completely reclinable backrest have been designed. However, an unresolved problem is that a gap remains between the backrest and the seat. Another problem consists in the fact that the arm rests of the chains cannot be lowered completely so that they are arranged both level with the seat.

Moreover, not all the chairs have a leg rest which is able to help increase the comfort of the persons also sat in a position with the backrest inclined in the bed position, nor is the leg rest, when present, able to reach an extended position such as to form a continuous surface with the padding of the seat.

Moreover, the chairs hitherto available on the market are unable to withstand suitably the loads and the stresses generated by the changes in speed and direction of the vehicles. In order to be comfortable, the chairs must be able to withstand these stresses so as to limit their effect on passengers.

More specifically, chairs or seats for use in aircraft must comply with standards, for example AS 8049 (Performance standard for seats in civil rotorcraft, transport aircraft and general aviation aircraft) and CS 25 (Certification specification, for large aeroplanes) and in particular meet the static and dynamic certification requirements in accordance with the relevant paragraphs CS 25.561 and CS 25.562.

In particular a certified chair or seat for use in aircraft should be able to withstand the sudden dynamic stresses also arising from emergency situations without becoming detached from the floor, while ensuring the safety of the passenger sat on it.

The patent U.S. Pat. No. 4,637,652 describes a chair in which the backrest is fastened to a kind of leg rest by means of a rotational link such that, when the backrest is inclined, the leg rest and the arm rest move simultaneously, the latter being in turn fastened to the backrest by means of levers and to the seat by means a rotational pivot. From this document it is not possible to deduce any different configuration in which the leg rest is fastened to a front part of the seat frame and is independent of the movement of the backrest, in order to increase the comfort of the passenger, allowing him/her to move the various parts of the chair independently.

Patent application WO2007/072045 describes a chair in which the leg rest is not fixed to the front part of the chair, but to a support structure of the cabin or the associated furniture. In this document the system for reclining the backrest envisages the use of a rack. An electromechanical actuator is also required in order to move the chair on the rack. Furthermore, the system of frame pins for the reclining position slides inside guides which are situated in the fixed structure of the chair. Finally, the arm rests form an integral part of the fixed side and do not drop to the level of the seat and therefore in no case is there an increase in the usable space and comfort for the passenger either in the vertical position of the backrest or in the bed position.

Patent application WO2008/107689 describes a chair provided with an actuator, presumably fixed to a bulkhead or to supporting structure of the cabin or the furniture, and not directly to the chair. In order to allow the bed position to be reached, a forwards displacement of the support frame also is necessarily required in order to move the chair away from the bulkhead and allow it to reach the wall-mounted leg rest portion which is completed with the raisable portion forming part of the chair. Therefore, in order to achieve a bed configuration, it is necessary to move the entire supporting structure of the chair and also use a support portion fixed to a facing and opposite bulkhead. Moreover, the guides for reclining the chair into the bed position form part of the fixed supporting structure, and not the movable structure, and as a result the rotational pins are fixed to the movable structure of the backrest and the seat, respectively. Moreover, the arm rests may perform only a slight downwards displacement following the forwards movement of the entire chair by means of a subframe which is moved only with the downwards rotation of the backrest. Therefore there is no separate movement of the arm rests, seat and movable structure.

Patent application US 2007/262625 describes a chair which has rotational pins which slide inside guides having the function of bringing the chair into the bed position by means of electromechanical and not mechanical actuation. Moreover, the guides which are used for the reclining action are fixed onto fixed structures and the entire (bottom) structure of the chair slides forwards on wheels by means of a motor. In so doing, the chair is reclined only by moving simultaneously also the entire bottom structure.

A spring is also present, being situated underneath the backrest and the headrest, with the aim of cushioning and damping the backrest while it assumes the bed position, since, once a dead-centre position between two pins is passed by, the backrest drops suddenly as a result of gravity.

Patent application US 2005/168042 describes a chair provided with a backrest which, when brought into the bed position, does not move the seat backwards and forwards, but raises it only by means of two guided bars sliding on rollers. Moreover, the two bars also have the function of moving the leg rest upwards, independently of the backrest. The headrest has two sliding pins provided with engaging holes which operate by means of cooperation with engaging systems. As regards the arm rests, they are moved by means of a release system with a downward free-falling movement, performed on a single fixed central pivot which, by means of a pin, moves inside a labyrinth. The labyrinth system requires axial centring or adjustment of the pin.

A reclining chair for aircraft is also described in patent application US2006/0181118. However, the relative arrangement of backrest and seat only allows predefined and/or stepwise adjustments. Moreover, this document has an attachment system for the safety belt to moving parts, thereby resulting in structural disadvantages and the need for further dynamic certification. The structure as a whole does not include the leg rest and results in maintenance and assembly difficulties.

It has now been found a specific combination of parts and a suitable choice of components, materials and shapes which allows to produce a reclining chair able to overcome the drawbacks associated with similar chairs known hitherto. The configuration and the form of parts described below provide a device which is more comfortable, easier to use and safer than the chairs known hitherto. Further advantages of the invention will become clear from the following description.

SUMMARY OF THE INVENTION

A reclining chair with an extendable leg rest which overcomes the drawbacks of the prior art has now been developed and forms the object of the present invention. Said chair comprises an anchoring structure, a frame with a seat, a backrest, two arm rests and, advantageously, a leg rest and a headrest and is characterized in that the backrest, when fully reclined, and the arm rests, when fully lowered, form together with the seat a substantially flat surface comparable to a bed.

Another object of the invention resides in a reclining chair provided with a passenger leg rest which, when fully raised, forms with the seat a substantially flat surface which helps increase the surface area for supporting the passenger, ensuring greater comfort also for very tall passengers.

A further object of the invention resides in a reclining chair provided with a headrest which is adjustable and has a braked action, both heightwise and rotationally, with non stepwise adjustment.

A further object of the invention resides in a reclining chair provided with arm rests which can be lowered down to the level of the seat with a gentle braked movement adjustable depending on the weight, and not a free-falling movement.

A further object of the invention resides in a reclining chair provided with a safety belt having a third attachment point on the backrest, in order to comply better with the dynamic certification requirements.

A further object of the invention resides in a reclining chair rotatable through 360° and with a configuration which can be modified transversely and longitudinally in a mechanical (non-electric) manner simultaneously with rotation.

A further object of the invention resides in a reclining chair suitable for being fixed on any surface; in particular on aircraft rails of varying widths.

A further object of the invention resides in an anchoring structure for a chair provided with hinged attachments and feet adjustable widthwise, applicable in particular to reclining chairs.

Further objects of the invention will become clear from the description thereof.

BRIEF DESCRIPTION OF THE DRAWINGS

For a better understanding of the invention, the accompanying figures show a non-limiting example of the said invention.

FIG. 9a is a perspective schematic view of a type of anchoring structure 200 of the reclining chair 100;

FIG. 9b is a schematic view of the detail A of the anchoring structure 200 according to FIG. 9a;

FIG. 15a is a perspective schematic view of an arm rest 500 from the inner side;

FIG. 15b shows the detail 508 of FIG. 15a on a larger scale;

FIG. 24 is an overall view of the chair complete with padding and lining in the extended bed position.

DETAILED DESCRIPTION OF THE INVENTION

Figure 1:
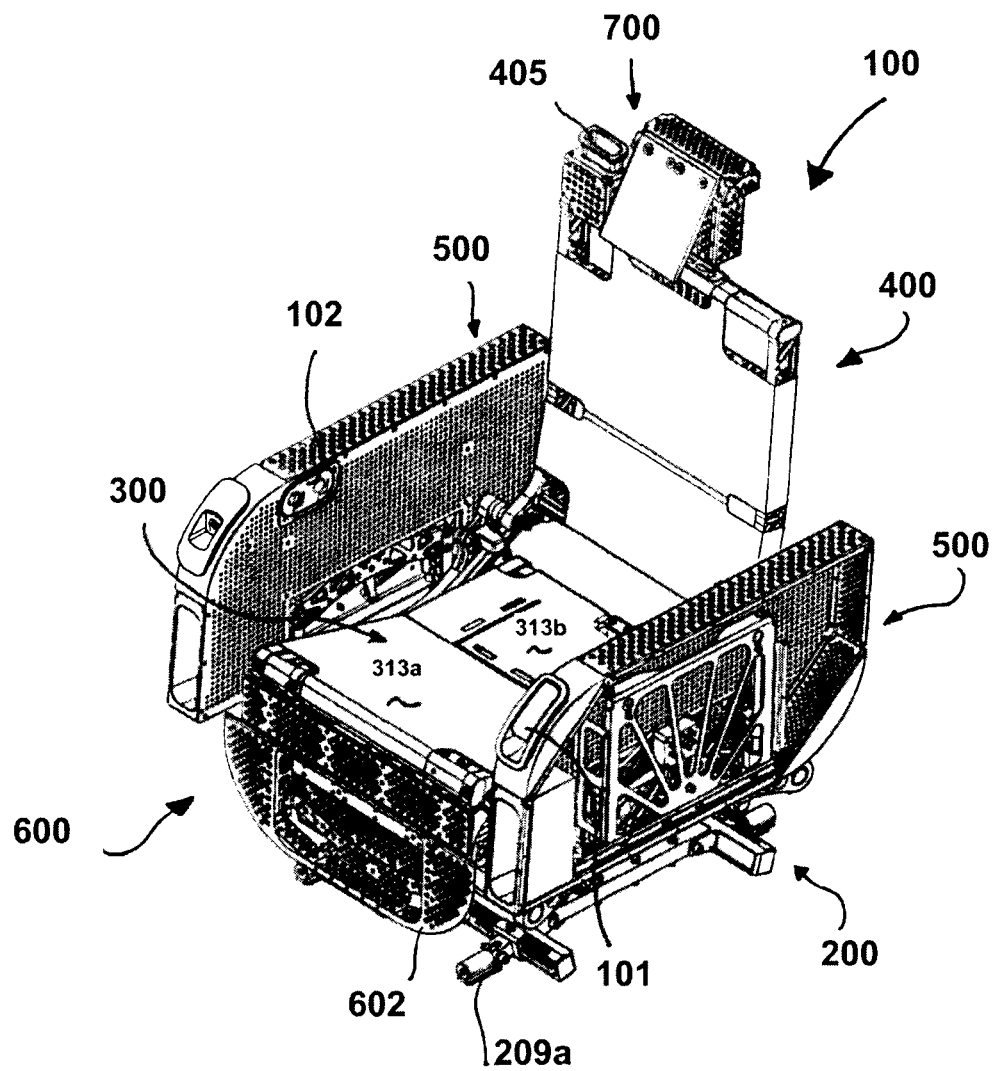
FIG. 1 is a perspective, schematic, overall view of the structure of the reclining chair 100.

The advantages of the chair according to the invention are outlined below with brief reference also to the accompanying figures.

The chair according to the invention complies with the abovementioned strict aviation standards, in particular the guidelines applicable to chairs or seats for civil aviation use (based on problems encountered during operation) and the requisites necessary for certification of the product in static conditions (load 9 g applied in all directions) and dynamic conditions (crash test with 16 g in longitudinal direction and 14 g in vertical direction).

The chair has an entirely mechanical operating system and is operated manually by the passenger; in fact a simple lever is used to perform simultaneous longitudinal/transverse sliding and rotation through 360° of the chair with respect to the anchoring structure.

Other controls in the form of levers or pushbuttons perform movement of the seat, backrest and leg rest so as to pass from the desired sitting position into the completely extended bed position, advantageously assisted by the arm rests which, when completely lowered, are aligned flush with the seat, the backrest and the leg rest, where present.

The controls for releasing the leg rest and for reclining the backrest into the extended bed position are advantageously located on the arm rests. This latter function is combined with the movement of the seat, namely while the backrest assumes the bed position the seat moves forwards at the same time so as to increase the comfort and space available for the passenger. The extendable headrest and leg rest ensure sufficient support also for tall persons, who, according to the European average, have a height of about 180 cm. The two side parts or arm rests can be lowered down to the level of the seat and are provided with a friction system which allows them to slide downwards in a "delicate" manner. When both the arm rests are in the completely lowered position and the entire chair is in the bed position, there is a more comfortable space for resting during medium and long-haul flights/journeys.

Moreover, the seat of the chair rests on an anchoring structure provided with hinged attachment points which ensure better damping of the stresses and with support feet formed so as to allow positioning of the chair also on surfaces which are not flat or on rails of different widths by means of sliding of the feet on unaligned rails.

At present, rail systems are designed with non-adjustable fixing fittings and therefore the possible presence of special, non-aligned rails on aircraft requires new base structures with a consequent different part number of the chair and new dynamic certification thereof with consequent greater costs associated with design and certification activities.

The innovation applied, namely the travel movement of 3 inches (=76.2 mm), towards the outside or inside of the floor fitting device, typically the set of track device, allows the structure to be adapted also to aircrafts with special offset rails, thereby reducing the modification time/costs both for the chair supplier and for the end client, with consequent lower management costs and greater versatility of the chair.

Another advantageous aspect of the chair is that inclination of the reclining backrest occurs at the same time as the advancing movement of the seat pan; in fact, a mechanical actuator performs reclining of the backrest which simultaneously performs, via a system of levers, also movement of the seat, all of which with a movement which is continuous and not in predefined steps. The advantage achieved is that of greater comfort of the seat both in the take-off/landing position and in the bed position for medium or long-haul flights/journeys.

Moreover, the arm rests or sides of the chair each have a release mechanism with friction bearings which prevent them from falling freely by means of gravity when the side is released for lowering. Release of the side is performed by raising it slightly followed by a falling movement with gravity and in this case the sliding movement is braked by means of bearings; thus the side is released gradually with no noise and greater comfort for the passenger. Moreover, the arm rests in the "fully down" position have the advantage that they are totally flush with the seat cushion, thus allowing the passenger to access/leave the chair with ease, this being useful in the case of persons with handicaps affecting the motor system. According to the prior art the arm rests, when moved, fall heavily once they have been released and not only hinder the movements of the passenger when sitting down or standing up or moving but also require continuous maintenance in order to adjust and realign the parts and gearing.

The arm rest (see FIGS. 7a, 7b and 5-17) is provided with a control mechanism, typically of the lever type, which can be operated by the passenger who, with a single action, is able to rotate, to move forwards/backwards and to the right/left the entire structure of the chair with the passenger sat on it. This results in greater comfort, easier use and the possibility of working/eating on-board with a few minor manual alterations to the cabin layout (e.g. two chairs in the same row may be rotated during the flight and arranged so that the passengers are able to speak face-to-face and, with the same ease, repositioned in the TTOL (Taxi/Take Off/Landing) position).

Figure 2:
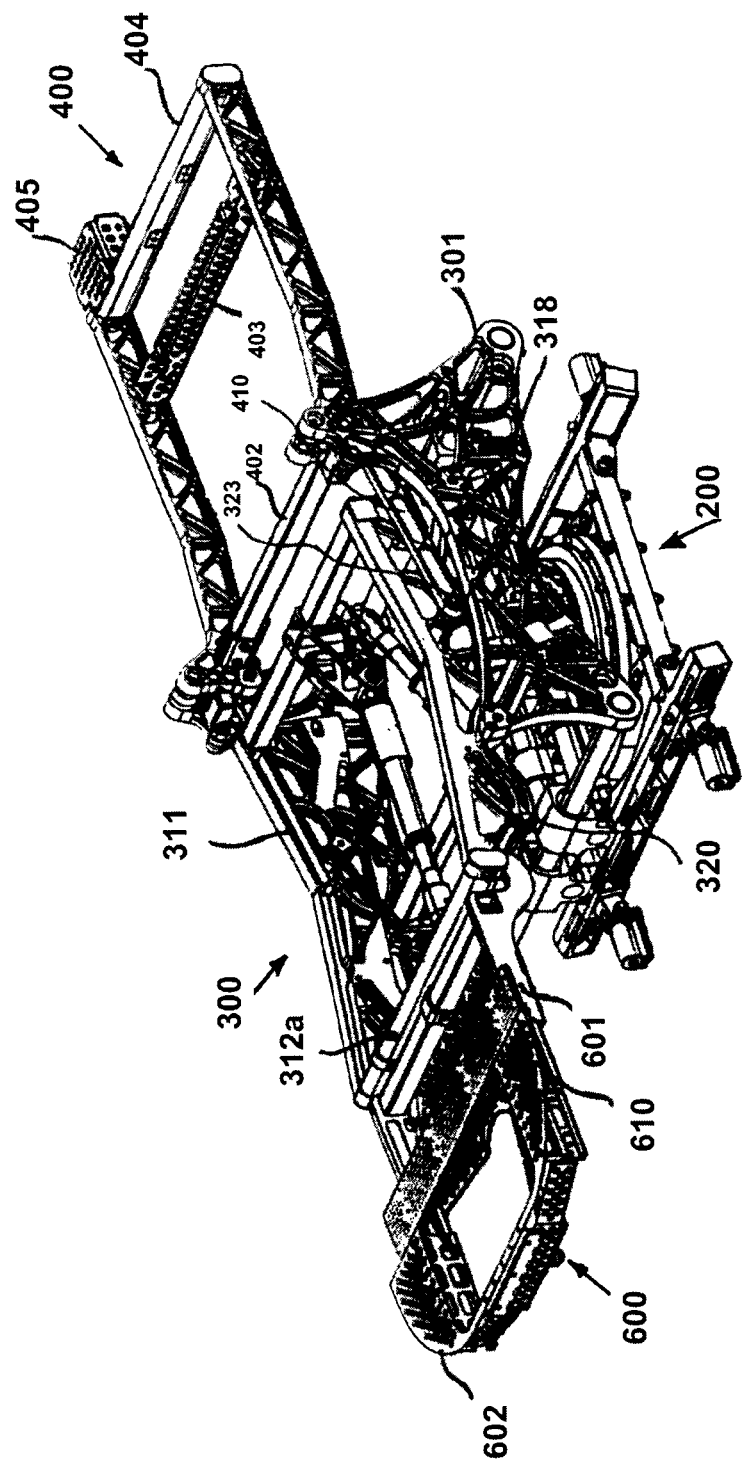
FIG. 2 is a perspective, schematic, overall view of the support structure of the reclining chair 100 in the extended bed position.

The leg rest (FIGS. 19 and 20) forms an integral part of the seat structure 300B and can be operated by means of a control 102 (FIGS. 3-5), for example pushbutton or lever, which can be easily accessed by the passenger and which operates an actuator 309, 309' such as, preferably, a jack. Once operated, the jack 309, 309' extends and operates the structure 600, raising it practically level with the seat by sliding along the guides 610 (FIG. 2). In this way the passenger has the possibility of having a greater area for supporting the legs and may enjoy a greater sitting comfort. The leg rest is also advantageously provided with a central compartment 603 for storing the safety systems of the vehicle/aircraft, such as the oxygen mask, life jacket and the like.

Figure 3:
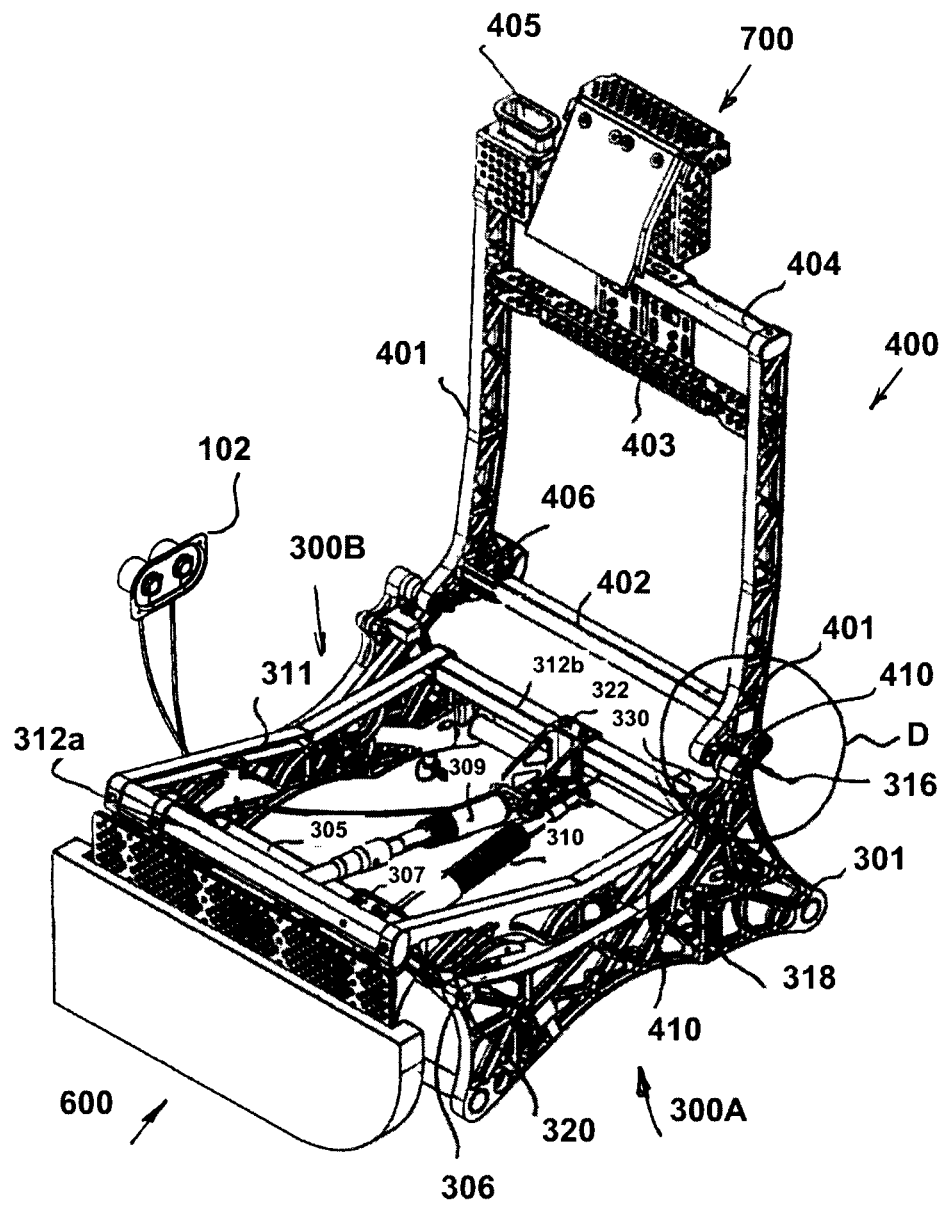
FIG. 3 is a perspective schematic view of the structure of the chair without the anchoring structure and the arm rests.
Figure 5:
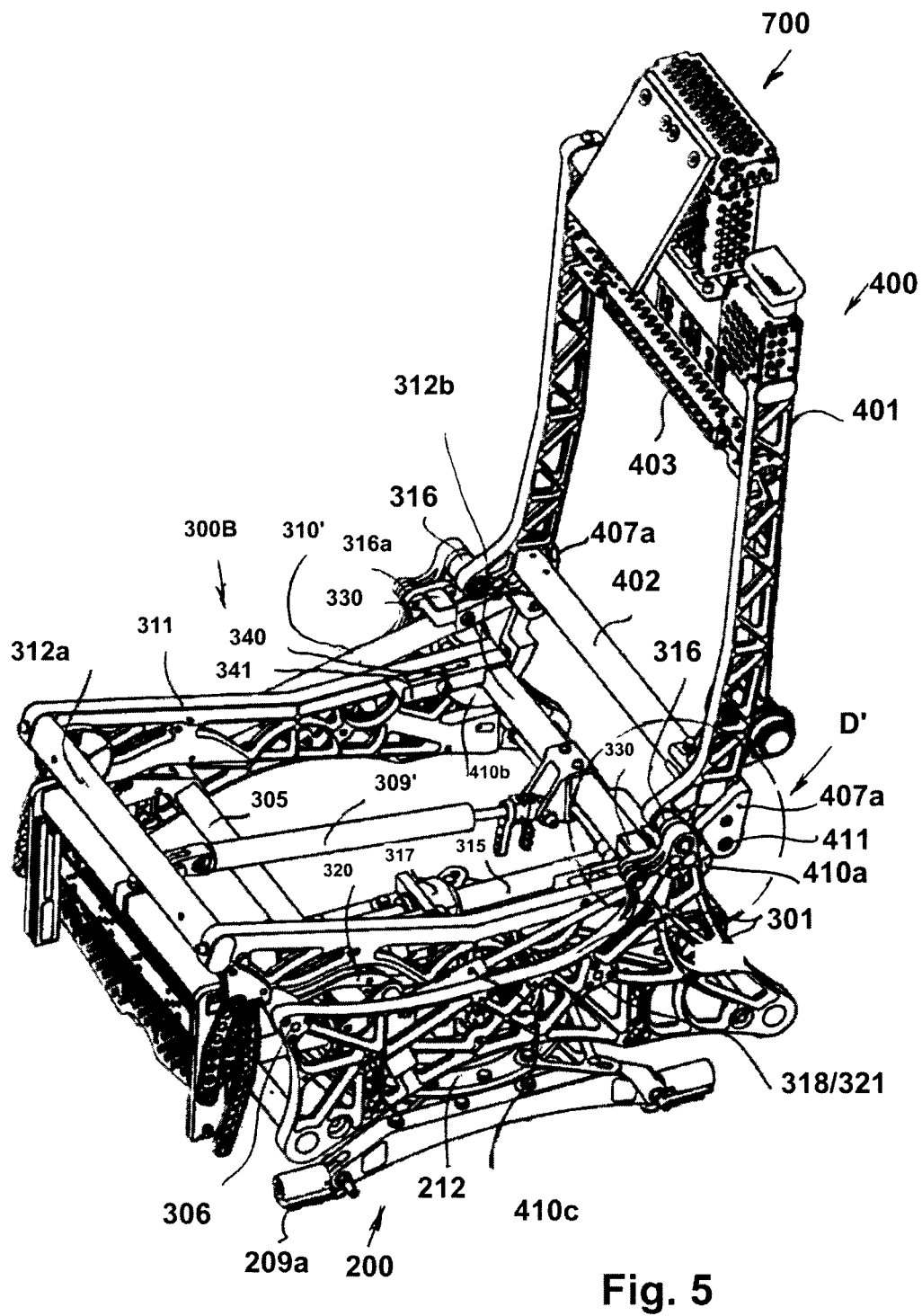
FIG. 5 is a perspective schematic view of an alternative embodiment of the structure of the chair.
Figure 19:
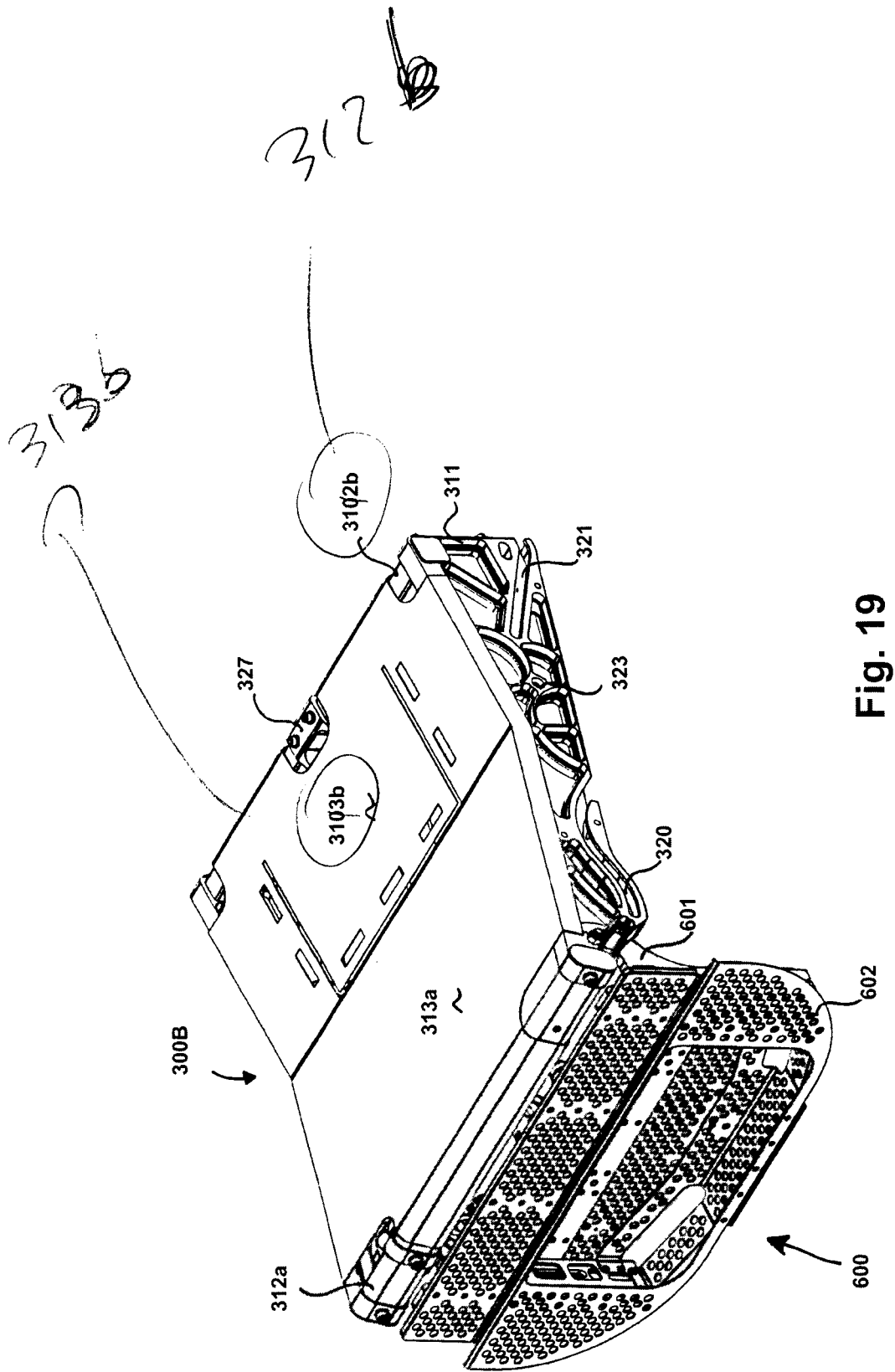
FIG. 19 is a perspective schematic view of the assembly comprising seat 300B and leg rest 600.

The support structure or frame 300A (FIG. 12) has pins 316—described below—without an attachment point for the safety belts, which, according to the invention, is separate. For reasons of structural strength and ease of access said attachment point is located in the top part 303 of the frame side support structure, in particular indicated as attachment point 316a. Moreover, the rollers or pins 306 and 318 by means of which the seat movement is performed are not mounted on the movable seat structure 300B, but are located on the base or support structure or frame 300A and slide inside the side support structures or cross members 311 of the seat 300B movable inside the cavities 320 and 321 (FIGS. 3, 5 and 19). This arrangement of parts ensures a greater structural stability and greater ease of maintenance, as indicated below.

Figure 12:
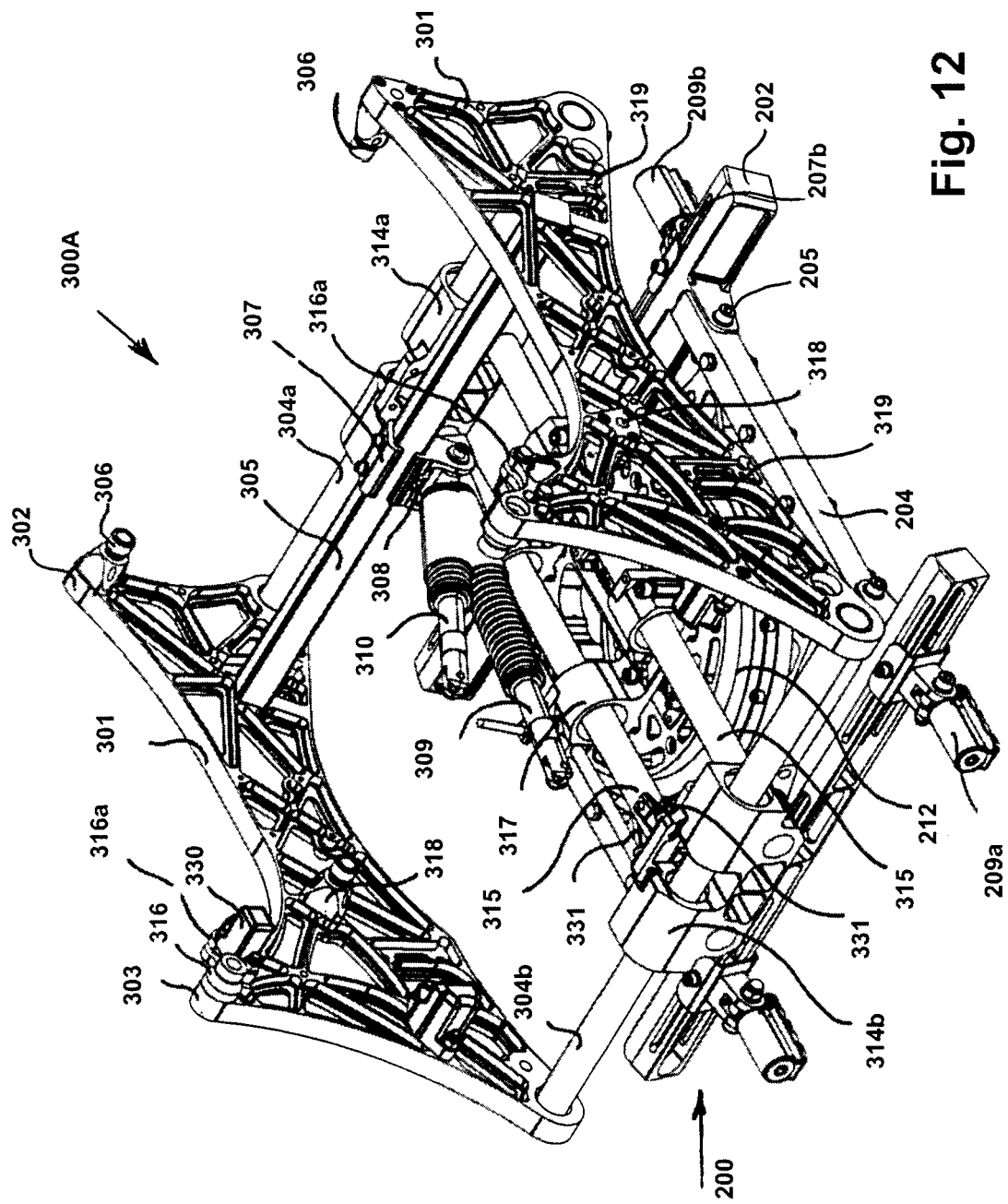
FIG. 12 is a perspective schematic view of the structure or frame 300A and of the anchoring structure 200.

In fact, as shown in FIGS. 12 and 19, the movable seat structure 300B may be easily removed from the base structure or frame 300A of the chair by means of removal of quick-release aeronautical pins which are arranged on each side of the chair and inserted inside suitable holes 323 and which fasten the structure of the seat 300B to the frame or base or support structure 300A.

Figure 14:
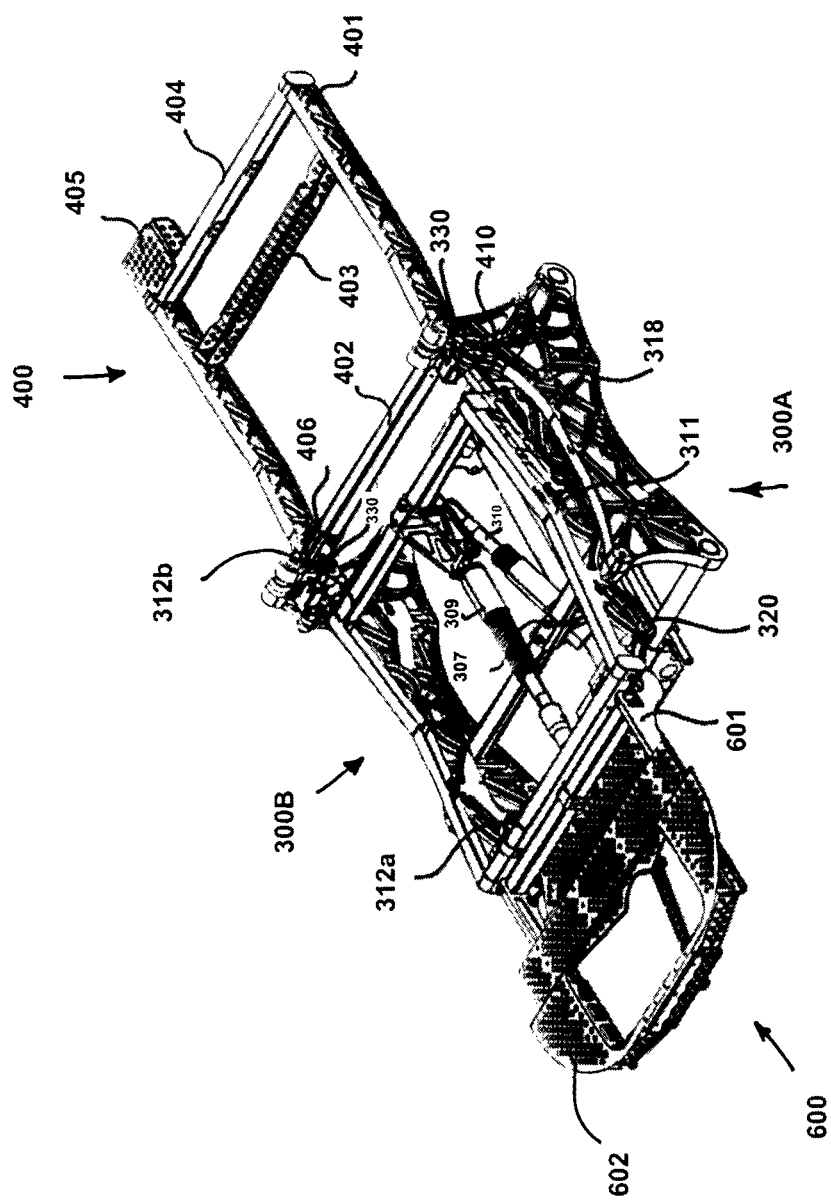
FIG. 14 is the same view as in FIG. 13 with the chair in the extended bed position.

The chair has been designed to withstand high dynamic loads and obtain airworthiness for aircraft navigation; for this reason, it envisages the use of standard lap belts which are secured to the aforementioned attachment point 316a and moreover a third securing point of the shoulder type, positioned on the support of the backrest 406 for the so-called "inertia reel" safety restrain belt (FIGS. 3 and 14).

The backrest 400 is designed to house a 3-point safety belt with a point for securing the inertia reel on the aforementioned block 406 which is fixed on the anti-torsion tube 402 (FIG. 3). The backrest is composed of two connecting side cross members 401 which are held together by two cross bars (and not anti-torsion plates as in the prior art) 402 and 404 and by a U-shaped plate U 403 which acts both as an anti-torsion and supporting reinforcement for the headrest structure and as a support and tensioning guide for the safety belt which slides inside the backrest and emerges from the sliding seat 405 for use by the passenger in TTOL.

The headrest, differently from the structures of the prior art, which are provided with systems for adjustment of the heightwise displacement by means of predefined steps on the tubes (similar to certain motor vehicle headrests), is made as a strong and light structure and with aluminium sections on which four adjustable sliders are mounted. In this way the passenger may raise and lower the entire headrest from the rest position into its fully extended position, with all the possible intermediate positions and without predefined steps. The headrest (FIGS. 21 and 22) has a precision guide 703 which is braked during the up/down movement by means of adjustable friction blocks 704. Friction hinges 705 are advantageously used for the rotational movement of the resting surface 706.

In order to be able to recline the backrest the passenger operates one of the controls, for example release pushbuttons or levers 102, which operate one or more actuators or jacks which may be in parallel 310, 310' (FIGS. 3 and 5). In this way, with simultaneous application of the passenger's weight against the backrest, the actuator or jack 310, 310' is compressed and the bed position, indicated for example in FIGS. 2 and 14, is thus reached with a gentle, uniform and sequential movement. The backrest, while it is being reclined, operates the lever mechanisms 410 (FIGS. 3 and 4) or 410b (FIG. 6) which are fastened by means of quick-release pins inserted inside the holes 323 of the base or support frame 300A, causing the seat 300B to slide on the pins or rollers 308, 318 inside the recesses 320 and 321, producing as a final effect gradual forwards and upwards sliding of the seat with alignment of the backrest in a full bed position, thereby ensuring comfort for the passenger when this position is reached.

In the case where a single jack 310 or 310' is provided, said jack may be advantageously assisted by a resilient device, for example a recall spring or the like, or may operate independently in the ease of very low backrests, such as those used an private short-haul jets.

A further major advantage of the chair consists in its structure which is entirely modular, namely the backrest 400 is fastened to the seat 300 which, with its part 300B, is attached to the leg rest 600, while the arm rests are fastened to the part 300A by means of the frame side support structures 301. The part 300A is attached to the anchoring structure 200 which is secured to the aircraft rail/track by means of adjustable track fitting 209a, which may be slidably adapted to different types of rails.

By means of the controls 101 which are preferably in the form of a lever assembly 101 (FIGS. 7a and b), in particular by raising the handle 103, the passenger is able to perform simultaneously rotational release through 360° of the chair about its axis in both the clockwise and anti-clockwise direction, thus actuating the bearing plate 212, and release of the braking elements 331 for longitudinal and transverse movement of the chair with respect to its anchorage. The effect which is obtained is that of easy rotation and simultaneous sliding by means of a single lever 101.

In greater detail and still with reference to the accompanying figures, the structure of the reclining chair 100 according to the invention comprises an anchoring structure 200 having, mounted thereon, a seat—generally denoted by 300—which comprises a base structure or frame 300A which forms a support for a seat structure 300B, in turn connected at the front to a leg rest 600; the frame 300A being in turn connected laterally to two arm rests 500 and at the rear to a backrest 400 which is fastened to the seat structure 300B by means of a lever system and on which a headrest 700 is mounted.

With particular reference to FIGS. 9a and 9b, the anchoring structure 200 has a substantially quadrangular form with a front positioning beams 201 and rear positioning beams 202 which are parallel to each other and advantageously provided with horizontally adjustable systems for fixing the chair to the floor. The positioning bars 201 and 202 are connected hingeably to longitudinal spreaders 203 and 204 which are parallel to each other and to systems for performing fixing to the floor.

Figure 10:
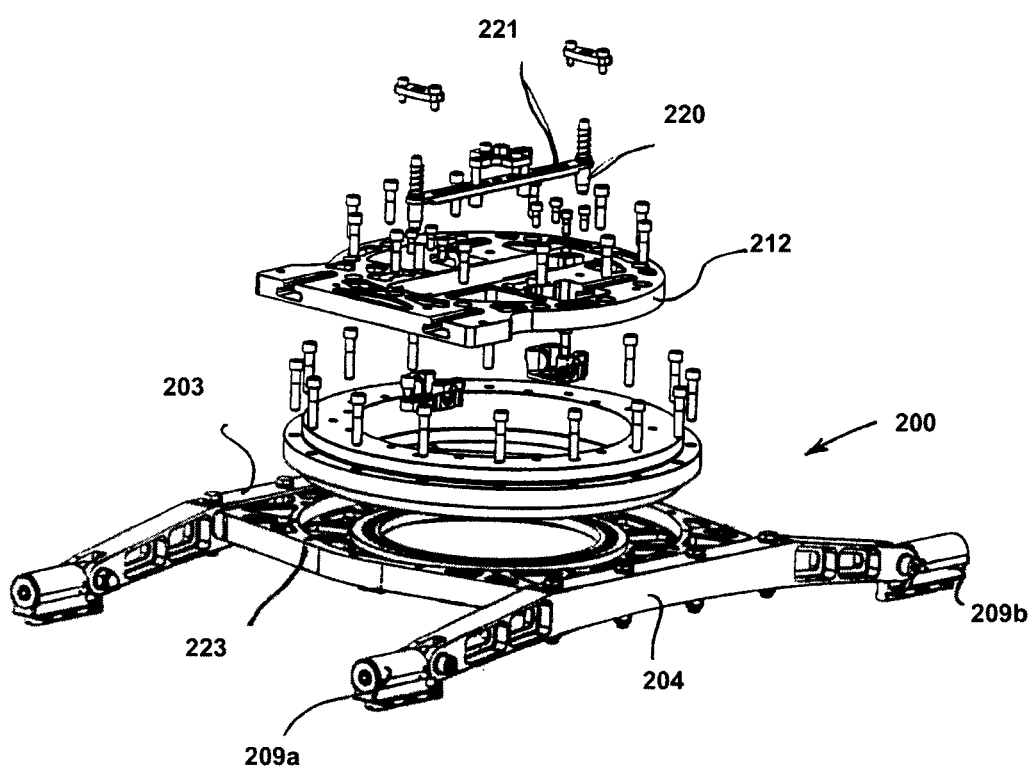
FIG. 10 is a perspective, exploded, schematic view of a simplified embodiment of a type of the anchoring structure 200 of the reclining chair 100.

In a simplified embodiment, shown in FIG. 10, the longitudinal spreaders 203 and 204 are not connected to the adjustable positioning bars 201 which are missing.

All the hinged connections of the chair structure may consist of means of conventional systems comprising pin and lock nut, such as the pin 205 and lock nut 206.

The front positioning bar 201 and rear positioning bars 202 are also provided with longitudinal slots or eyelets at the front 207a and at the rear 207b which slidably receive corresponding front elements or collars 208a and rear elements or collars 208b which can be connected to the systems for fixing the chair to the floor, said system, as shown in FIGS. 9a and 9b, being in the form of front track fittings 209a and rear track fittings 209b which be slidably fastened onto rails (not shown).

With such parts, the chair may be firmly connected in a slidably adjustable manner on any type of aircraft track since the collars 208a and 208b allow the relative distances of the feet 209a and 209b to be adjusted by means of sliding inside the eyelets 207a and 207b, thus allowing the structure of the chair 100 to be adapted to rails with different spacing. The connection between the collars 208a and 208b and the fitting 209a and 209b may be advantageously of the hinged type with nut 210 and lock nut 211.

The anchoring structure 200 also has centrally a rotating element, such as a bearing plate 212, rotating on hearings and joined to the longitudinal bars 203 for example by means of screws 213. The bearing plate 212 is fixed to the base structure or frame 300A of the seat 300 by means of a fixing system for example of the eyelet type 214 inside which parts, known per se and not shown, are inserted and fixed in a conventional manner.

Figure 11:
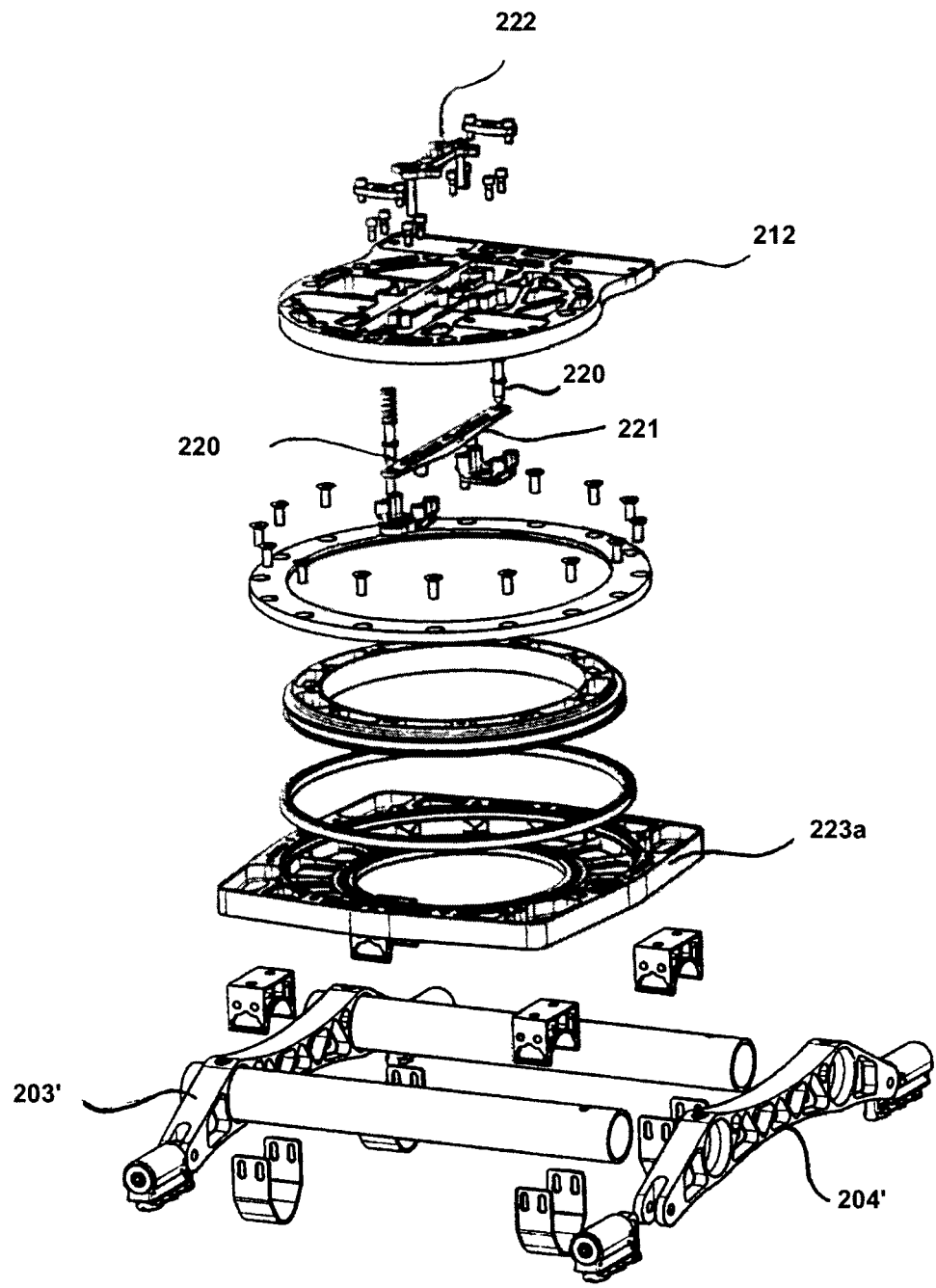
FIG. 11 is a perspective, exploded, schematic view of an alternative embodiment of the anchoring structure 200 of the reclining chair 100.

In the embodiments shown in FIG. 10 and FIG. 11, respectively, the anchoring system 200 is provided with a system for locking and rotationally positioning the chair formed by means of one or more release bridge-pieces 221 and/or 222 which free the pins 220 from their slots present on the support base 223 or 223a.

The seat 300 (FIG. 3) is formed by a base structure or frame 300A and by a seat structure 300B. The base structure or frame 300A comprises two frame side support structures 301 which have front shoulders 302 and rear shoulders 303 provided with respective pins 306 and 316. The frame side support structures 301 are connected together by front transverse bars 304a and 305 and a rear transverse bar 304b.

The front transverse bar 304a and rear transverse bar 304b support respective sliding sleeves 314a and 314b (advantageously provided with bearings) which in turn support at least one bar 315 (preferably two bars) perpendicular to the aforementioned transverse bars 304a and 304b. The at least one bar 315 (preferably two bars) is in turn slidably supported by at least one sleeve 317 (preferably two sleeves, advantageously provided with bearings) in turn rigidly connected to the rotating bearing plate 212. The set of sleeves and bars described above, assisted by longitudinal and transverse brakes 331, allows transverse and longitudinal displacement of the frame 300A with respect to the anchoring structure 200. The connection to the bearing plate also allows the frame to be rotated through 360° about a vertical axis.

The frame side support structures 301 (FIGS. 3, 12, 13, 14, 19 and 20) are also provided with rear pins 318, holes 323 and an end-of-travel device 330, the function of which is explained below, as well as eyelets 319 for connection to the arm rests 500.

The frame side support structures 301 hingeably support the seat structure 300B comprising two seat side movable structures 311 provided with front channels or grooves 320 and rear recesses or grooves 321 having a labyrinth guiding function so as to be respectively engaged by corresponding front pins 306 and rear pins 318 located on the frame side support structures 301 of the frame 300A.

The seat side movable support structures 311 are substantially parallel and connected together by front transverse seat bars 312a and rear transverse seat bars 312b.

Figure 20:
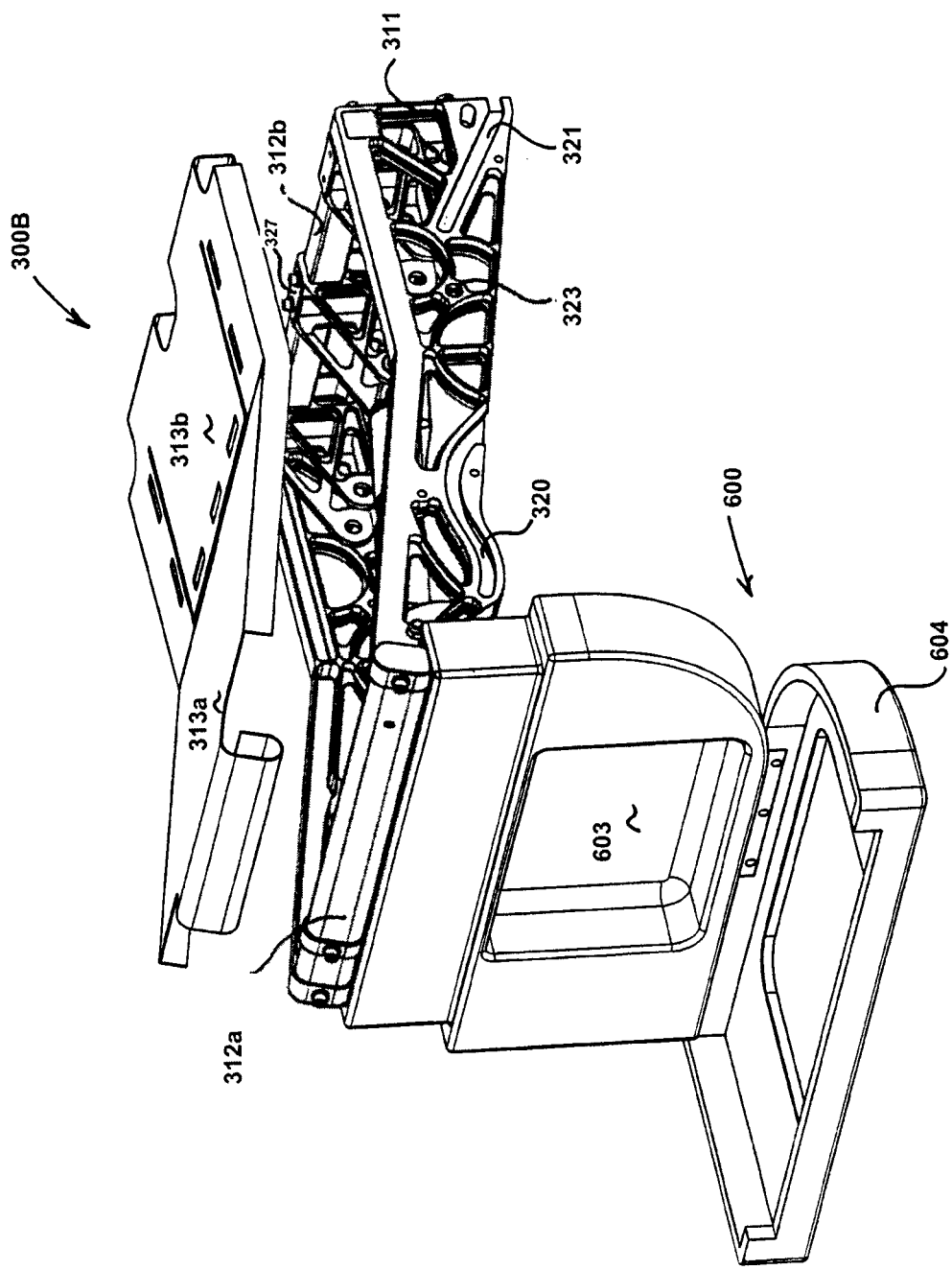
FIG. 20 is a perspective view showing the life-jacket and/or object storage compartment present in the leg rest.

As shown in FIGS. 1, 19 and 20, the seat structure 300B comprises at the top a sitting surface advantageously divided into two sections 313a and 313b which are slightly angled relative to each other so as to offer a greater sitting comfort. The sections 313a and 313b are advantageously made of aviation engineering fabric, preferably also fireproof fabric, or similar, which is light and able to be easily fitted onto/removed from the structures which it lines.

Figure 13:
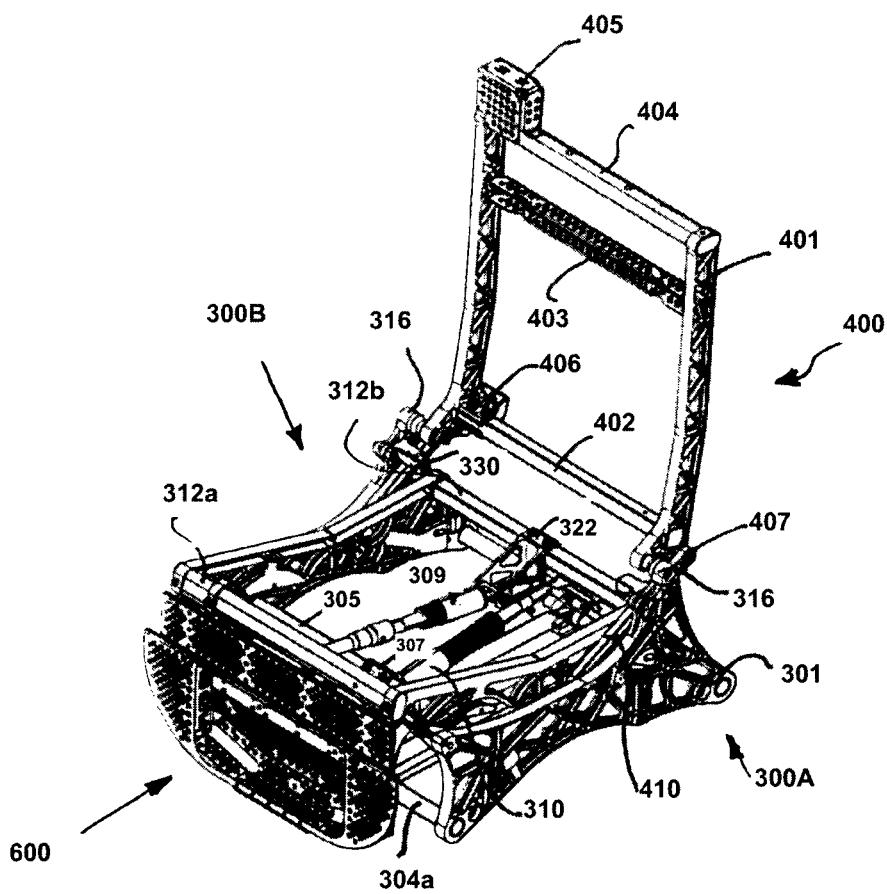
FIG. 13 is a perspective schematic view of the assembly composed of frame 300A, seat structure 300B, backrest 400 and leg rest 600 of the chair in the conventional take-off/landing position.

The seat side movable support structures 311 are further provided with holes or seats 323 for the hinged connection of lever systems 410 or 410a for simultaneous movement with the backrest 400 (FIGS. 13, 5 and 19). Pins (not shown and preferably of the quick release type) are housed in the seats 323 so as to fasten the seat structure 300B to the frame structure 300A.

The connection between backrest and seat is performed by means of levers 410 or 410a (FIGS. 3-6) which transfer the movement in a simple and direct manner, with a reduced number of fastening points and therefore plays on the complete structure 400, ensuring effective operation when attaining the bed position, with a reduced weight of the structure as a whole which is not a minor advantage in the aviation field.

A system of mechanical or hydraulic actuators or similar known systems, for example jacks, is advantageously provided in order to coordinate the movement of the seat with that of the backrest so that, when the latter is lowered or raised, the seat pan correspondingly moves with a gradual and continuous translatory movement backwards or forwards.

The actuators may be one or more independent mechanical or hydraulic jacks 309, 309' and 310, 310' (FIGS. 3, 5, 8, 12, 13 and 14) which work in opposition to each other for the coordinated movement of the seat 300, the backrest 400 and the leg rest 600.

Figure 8:
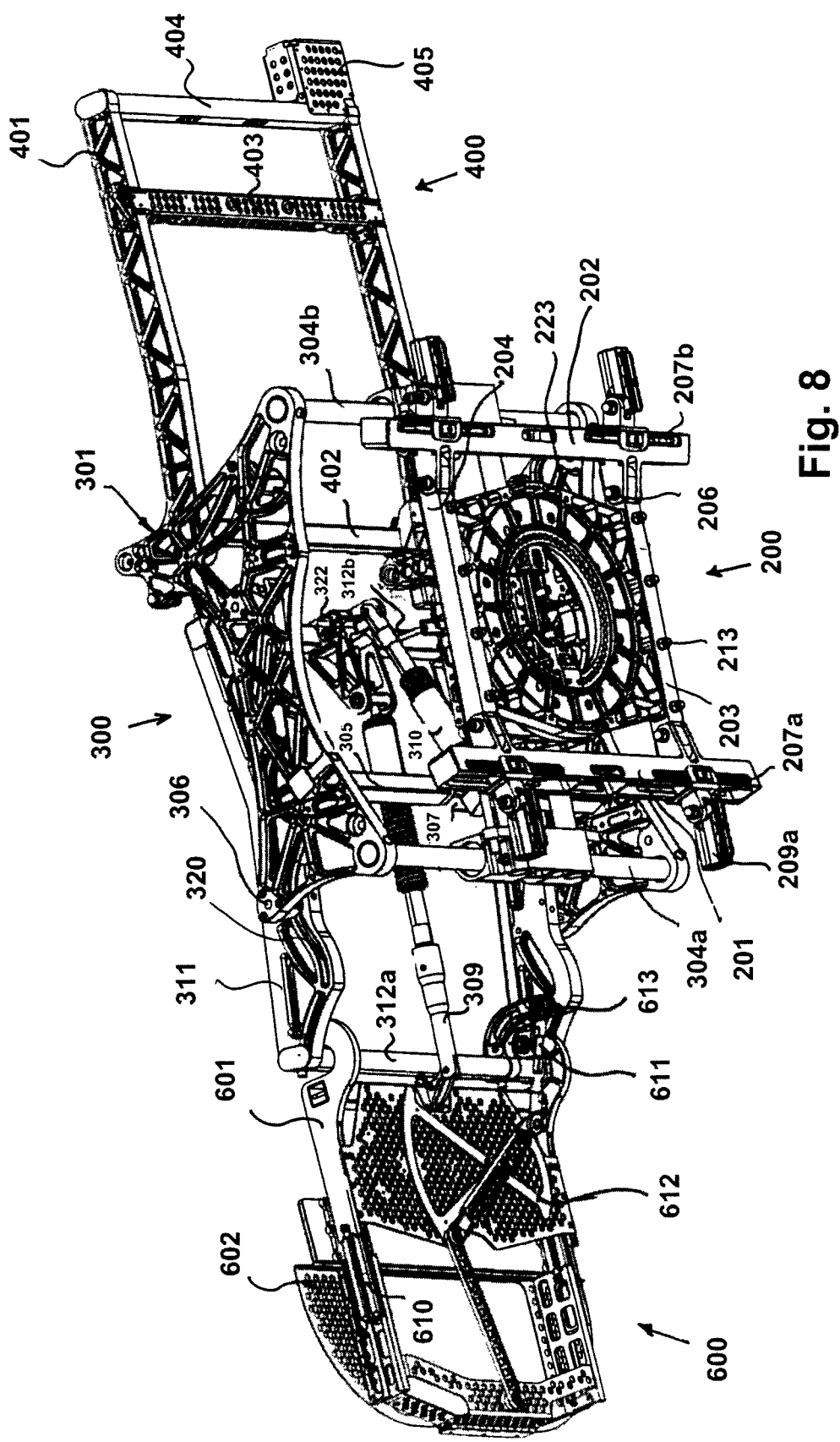
FIG. 8 is an overall schematic, perspective, view, from below, of the support structure of the reclining chair 100 in the extended bed position.
Figure 9:
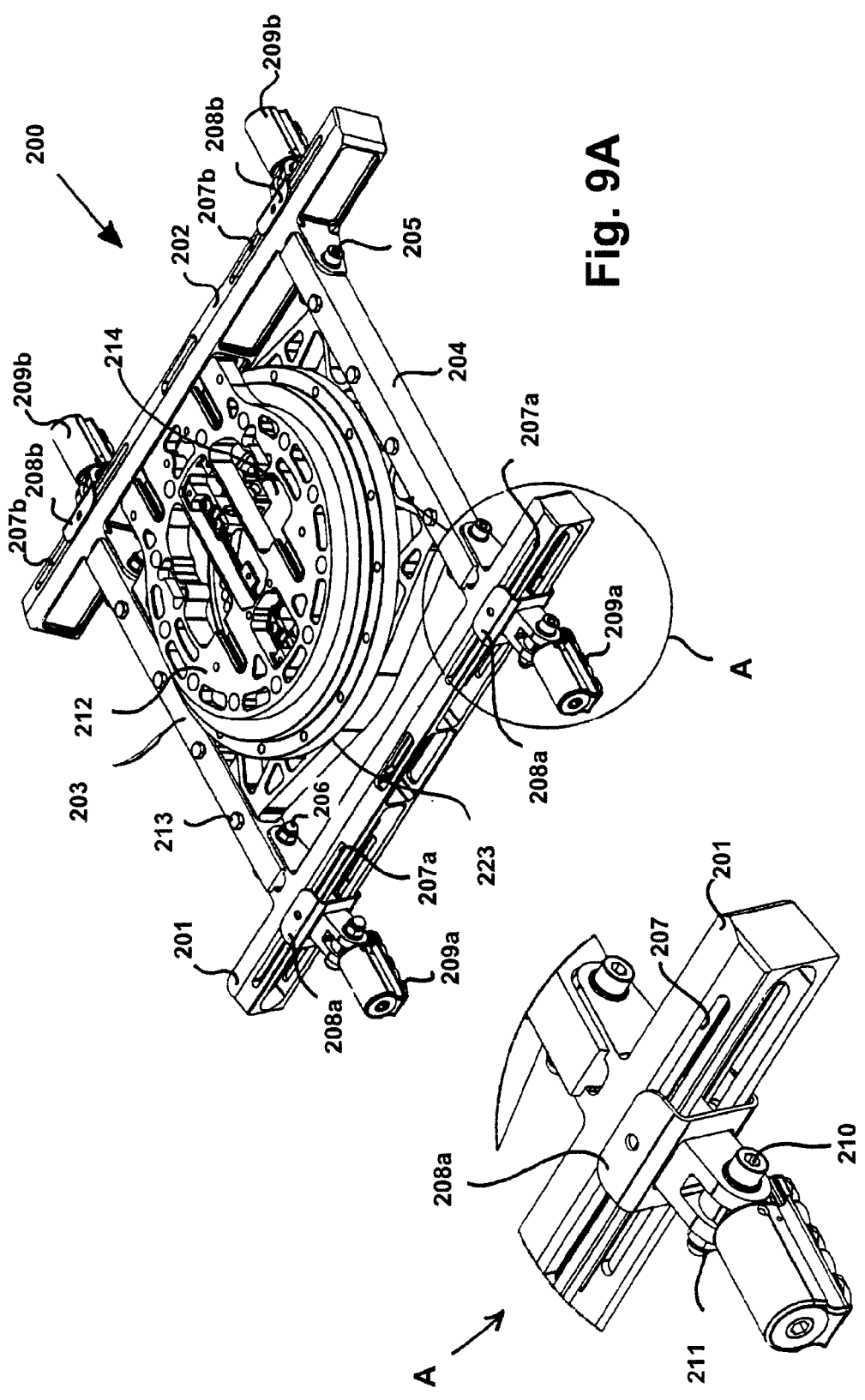

For example, the jack 309 is connected at the rear, advantageously hinged with connecting elements 322 fixed to the rear bar 312b and at the front is connected to the end of the leg rest close to the front bar 312a, as shown in FIG. 8, and is used for operation of the leg rest. The jack 310, which is used for operation of the backrest, is hingeably connected to connecting elements 307 fixed to the front bar 305 (FIG. 12) and, at the rear, to the aforementioned connection system 322.

Figure 6:
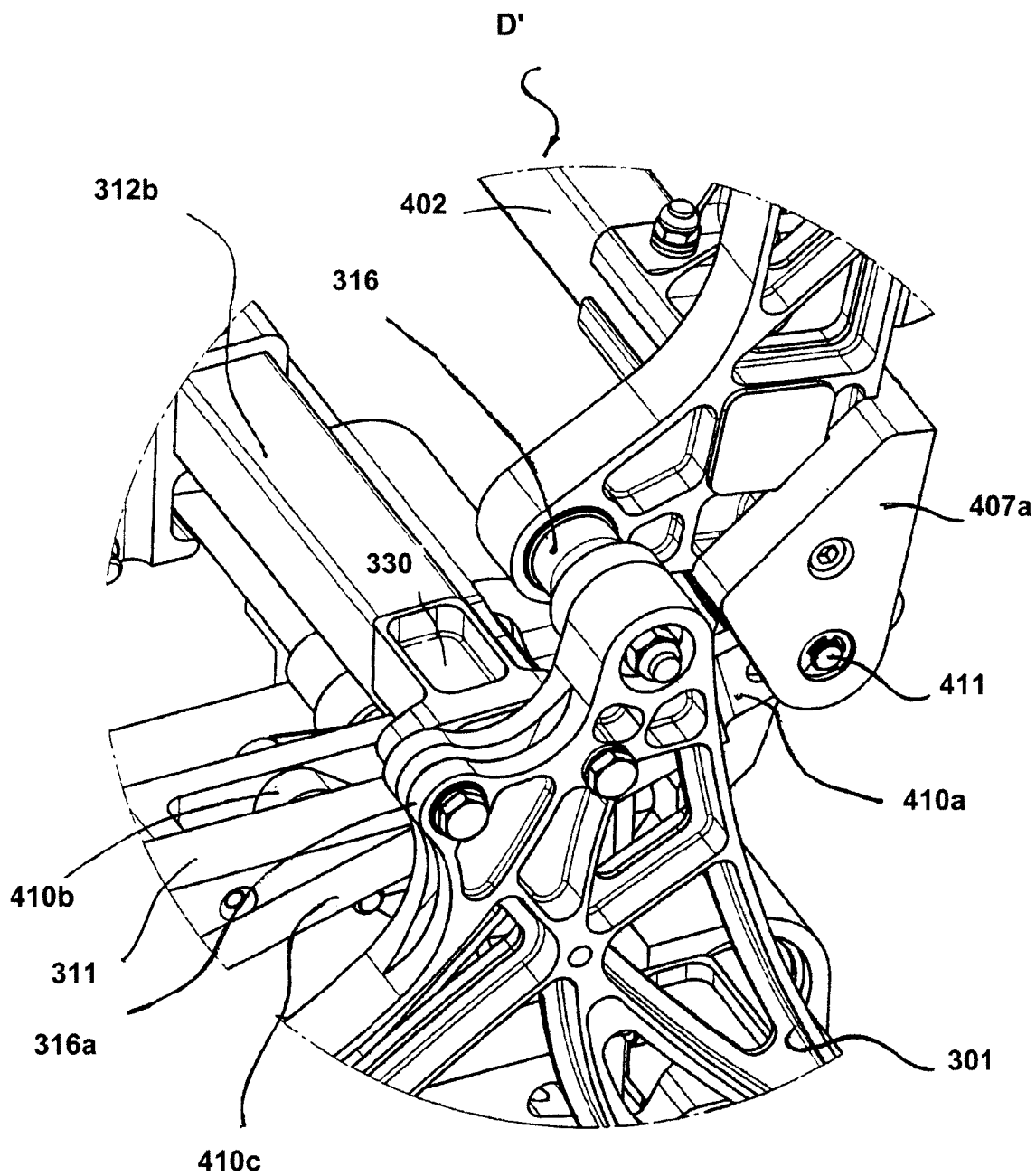
FIG. 6 is a perspective schematic view, on a larger scale, of the detail D' according to FIG. 5.

In the alternative embodiment shown in FIGS. 5 and 6, the jack 310' is connected to the backrest 400 by a pin 411, via a support bracket 407a, and, at the front, to the frame side support structure 301 of the frame 300A. The support bracket 407a is joined to the backrest and has, fixed thereon, via the pins 411, the lever systems 410b which move the seat and the jacks 310' and/or the balancing brakes 410c. The movement of the jack 310' is assisted by the operation of the balancing brake 410c which is connected to the backrest in a manner similar to the jack 310' and arranged opposite at the front on the frame side support structure 301 of the frame 300A. The jack 310' and balancing brake 410c allow the movement, by means of the lever systems 410b, of the seat 300B at the same time as movement of the backrest 400.

Figure 4:
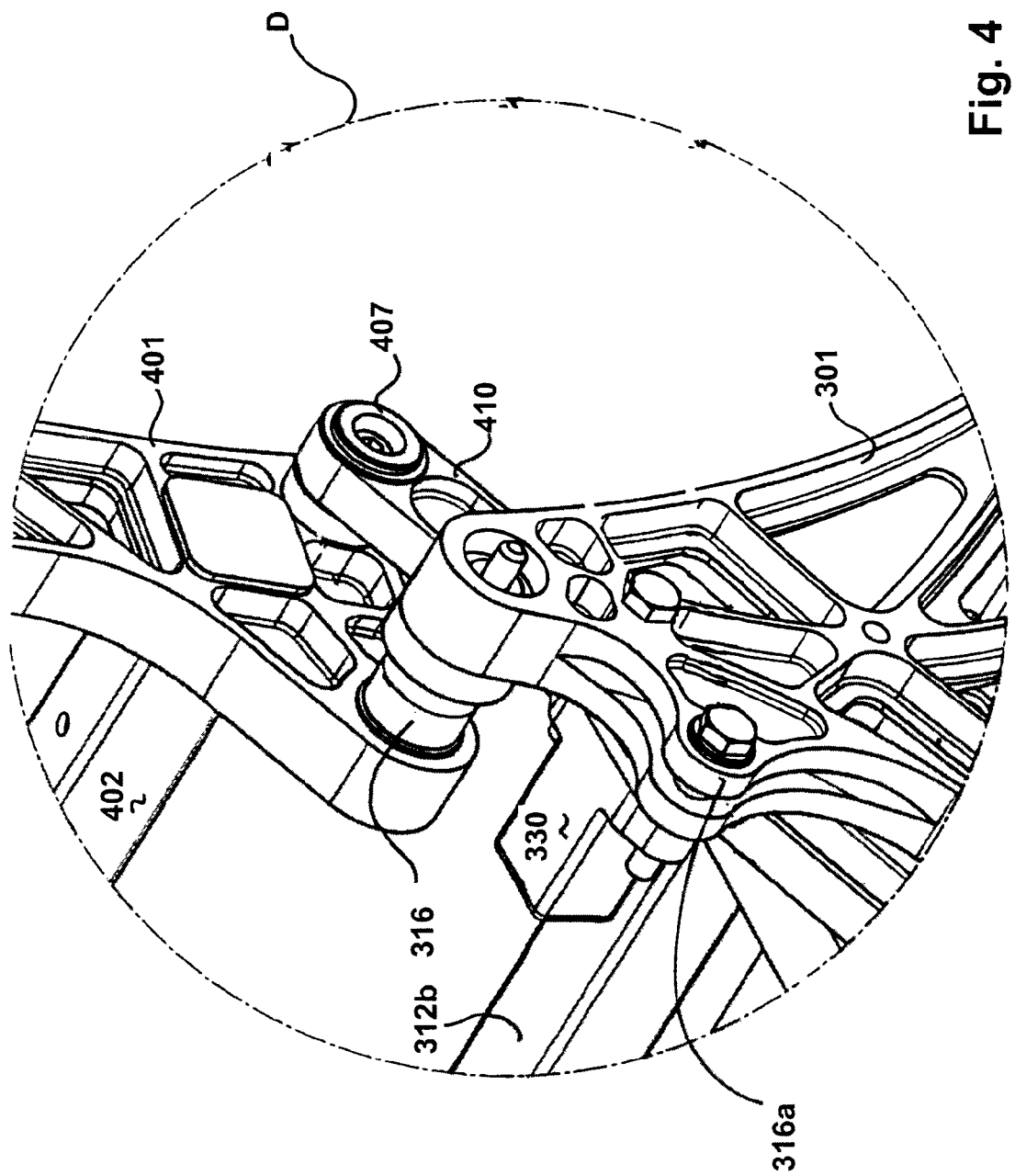
FIG. 4 is a perspective schematic view, on a larger scale, of the detail D according to FIG. 3.

In the alternative embodiment shown in FIGS. 5 and 6 for the movement of the backrest/seat the lever 410 according to FIGS. 3 and 4 is replaced, as mentioned above, with the system of brake levers 410a and 410b. The operability is maintained in both configurations, but the latter configuration results in a more compact structure of the seat 300, thus allowing the possibility of fitting frames (composed of the set of elements 311, 312a, 312b) which are narrower and more suitable for forming different seat widths.

Again in the embodiment according to FIGS. 5 and 6, the brake lever 410b assists the forwards and upwards movement of the structure of the movable seat 300B by means of sliding of the pins 306 and 318 inside the guides 320 and 321.

This arrangement of the parts, which replaces the lever 410 according to FIGS. 3 and 4, is connected to the backrest by means of the pin 411 and to the side support structure of the seat 311 of the seat structure 300B, by means of the screw 340 and screw support bracket 341, shown in FIG. 5.

With particular reference to FIGS. 13 and 14, the backrest 400 comprises a framework 401 with transverse stiffening bars 402 and 404 on which engaging means 406 and sliding means 405 for safety belts and associated mechanisms are respectively provided.

In particular, the transverse bar 403 is advantageously in the form of a simple U-shaped plate and acts as a support and tensioning guide for the safety belt which slides inside the backrest. The framework 401 is connected at the bottom to the frame pins 316 rotatably so as to allow complete folding down in alignment with the structure of the seat 300B.

The framework 401 has, below and behind the frame pins 316, suitable seats 407 (FIG. 4) for hinged connection to the lever systems 410 for simultaneous movement with the seat structure 300B.

The pin 407 has the function of ensuring rotation when the backrest is reclined and the lever 410 pushes the seat.

The pins 316 form the direct point of rotation (pivot) between the framework of the backrest 401 and the support structure or frame 300A of file chair. In a particular manner, the levers 410 or the brake levers 410a are the direct connection which allows movement of the seat 300 in the event of movement of the backrest 400. This system allows the backrest, when in the bed position, to lie completely within the same plane as the seat so that both parts form a continuous surface which increases the comfort of the passenger.

With particular reference to FIGS. 12 and 15-18, each arm rest 500 comprises attachment means 519 for connection to corresponding receiving seats 319 provided on the frame side support structures 301. Each arm rest 500 is further provided with friction-type release systems 501 of the type known per se, slidable on guides 502 for ensuring falling, by means of gravity, of the arm rest 500 with gradual and silent release. The engaged and released positions are achieved by means of a labyrinth mechanism 508 shown in FIG. 15b as a detail of FIG. 15a.

Figure 7:
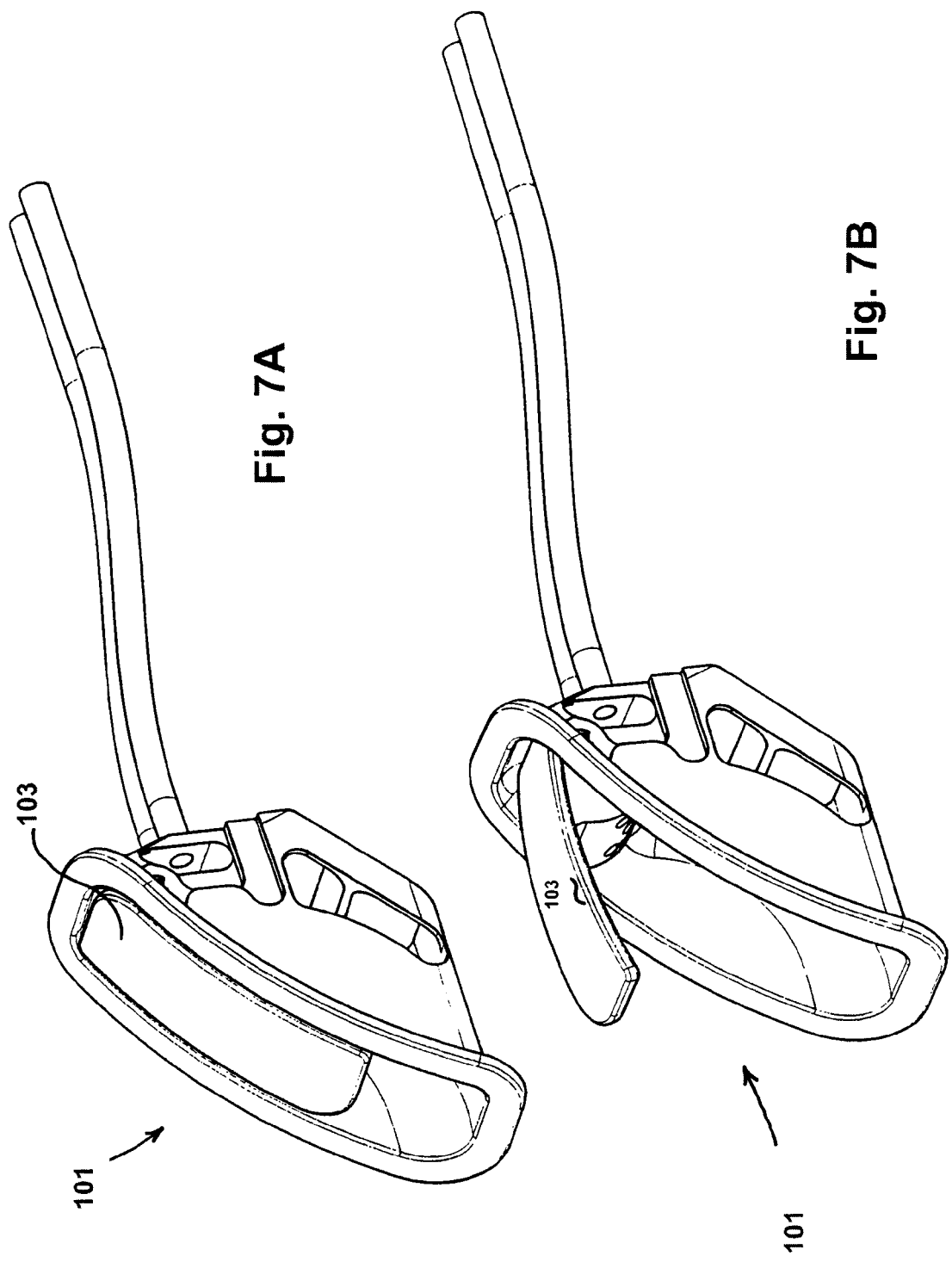
FIGS. 7a and 7b show details of the operating handle for variable positioning of the chair during rotation and longitudinal and transverse displacement.
Figure 16:
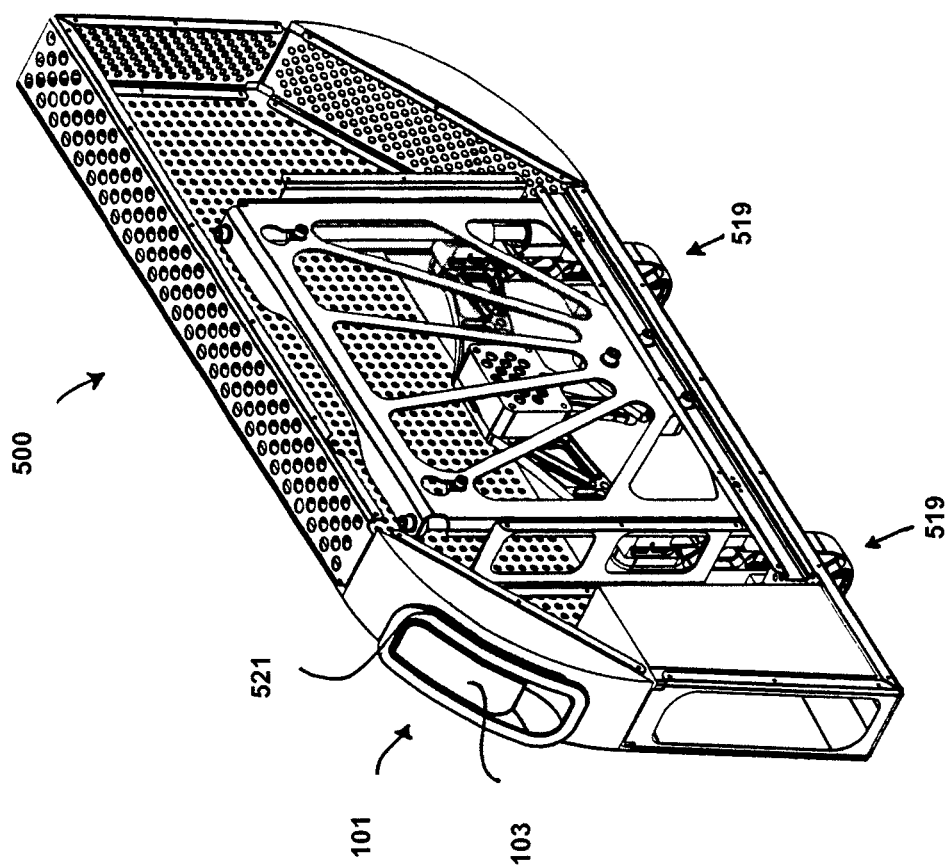
FIG. 16 is the same view as FIG. 15a from the outer side.

The front part of the arm rest is also provided with seats 521 for the mechanical controls 101, shown in particular in FIGS. 7, 15a and 16, for moving the backrest 400, the seat 300 and the footrest 600.

The top surface of the arm rest 500, when the latter is completely lowered, is located level with the seat 300, so as to broaden the area of the sitting surface.

Figure 17B:
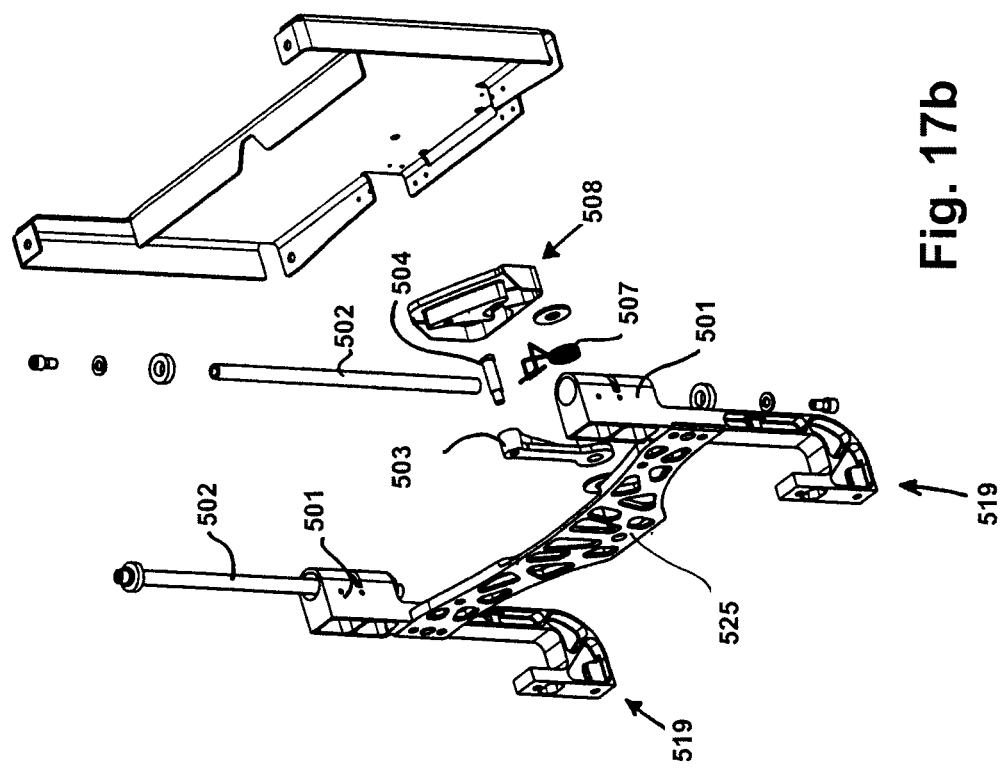
FIGS. 17a, 17b are exploded views of the components of the mechanical release system of the arm rest and the friction sliding system.
Figure 17A:
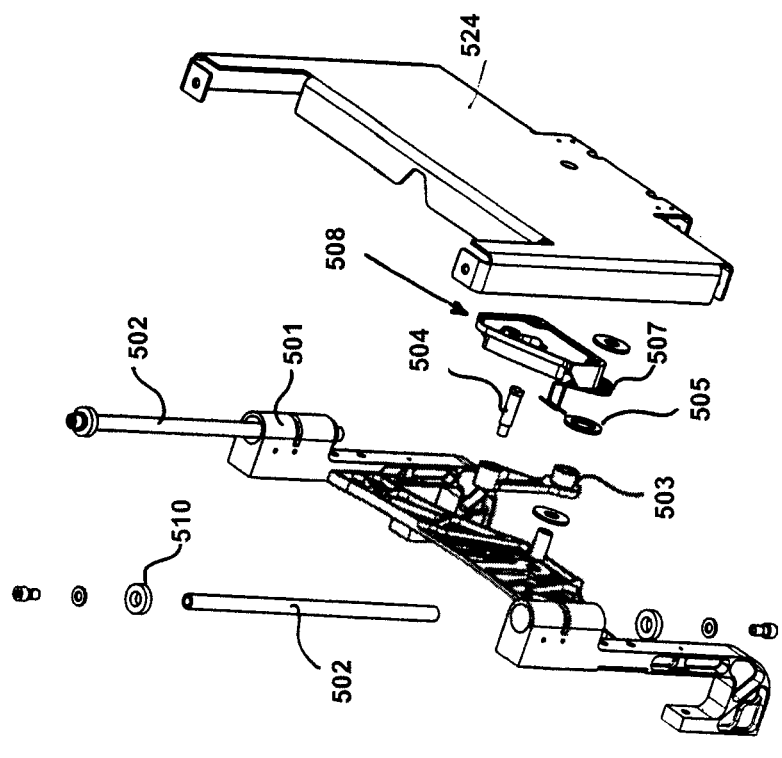

The friction release system shown in FIGS. 17a and 17b is composed of friction devices 501 forming part of the structure 519 for fixing the arm rests to the frame side support structure 301. The release system is formed by means of a torsion spring 507 which allows a device 503 and a pin 504 to rotate and move inside the labyrinth device or like 508 so that the arm rests are able to move downwards into the "fully down" position.

Suitable seats 521 on the arm rests also accommodate controls in the form of sets of levers 101 and pushbuttons 102, also shown in FIGS. 1, 3, 7a, 7b. One of the pushbuttons 102 operates the jack 309 so as to raise and extend the leg rest by means of the system shown in FIG. 8. The set of levers 101 is operated by a handle 103 and performs rotation of the chair about its axis (FIG. 12), by actuating the bearing plate 212, and transverse and longitudinal displacement, by actuating the brakes 331.

So as to ensure greater comfort for the passenger during flying, the controls, for example pushbuttons or levers 102, may be operated in order to assume the bed position or extend the leg rest 600. To assume the bed position or bring the backrest 400 back into the vertical position, the seat 300 and the backrest 400 are connected by means of pins 407 and the levers 410 or brake levers 410a.

The levers 102 move the support structure or frame 300A (FIGS. 3 and 12). In fact, the passenger, by operating the pushbutton or lever 102 (one form or type of which is shown only by way of example), releases the brake system 331, allowing the entire chair 100, except for the anchoring system 200, to move longitudinally and transversely (to the right and left) even after the passenger has positioned the backrest 400 together with the seat 300B in the bed position. Moreover, simultaneously with the release of the braking systems 331, by operating the button or lever 102, the braking system of the chair rotation is also actioned by means of the release bridge pieces 221 and/or 222 (FIGS. 10 and 11) which free the pins 220 from their seats on the resting base 223 or 223a which is part of the anchoring system 200.

With reference to FIGS. 2, 5, 8, 19 and 20, these show the leg rest 600 which is hinged underneath the section 313a of the seat 300 and is mounted on guides 610 slidable inside arms 601 coupled to the bar 312a so that the end part 602 is able to form an extension of the seat when the chair is in the bed position.

The leg rest 600, which has a movement independent of that of the seat 300, when it is operated, performs a rotation upwards so as to extend level with the seat structure 300B. In addition to rotation, performed by means of an actuator 309, 309' and a rotational lever 613, it is possible to combine also an extending movement, by means of the lever systems 601, 612 and guides 610, which can be adjusted by means of an adjusting element 611. The advantage of this solution is that in this way the total length of the chair in the bed position or with just the leg rest extended is increased, thus improving the sitting comfort.

Advantageously, the end part 602 has a compartment 603 with a lid 604 which can be used as an object holder, for example for aircraft oxygen masks, life jackets or the like. The leg rest is operated by means of the pushbutton 102 which activates the jack 309, 309'. Once activated, the jack extends and operates the structure 600, raising it until it is practically level with the seat by means of sliding along the guides 601.

Figure 21B:
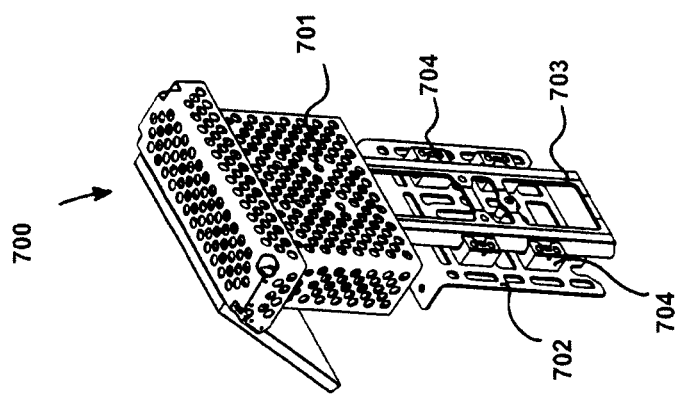
FIG. 21b shows the same view as FIG. 21a, but from the rear.
Figure 21A:
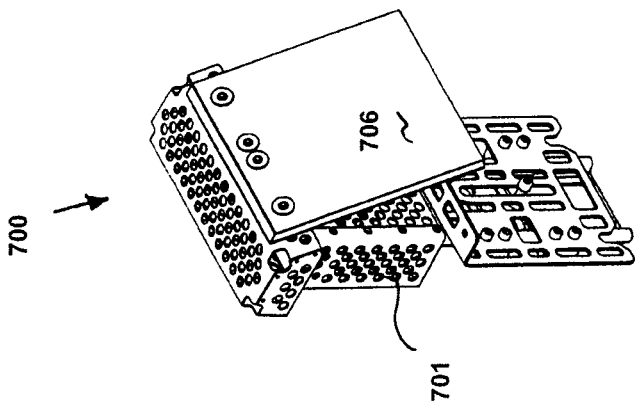
FIG. 21a is a perspective schematic view of the headrest 700 from the front.
Figure 22B:
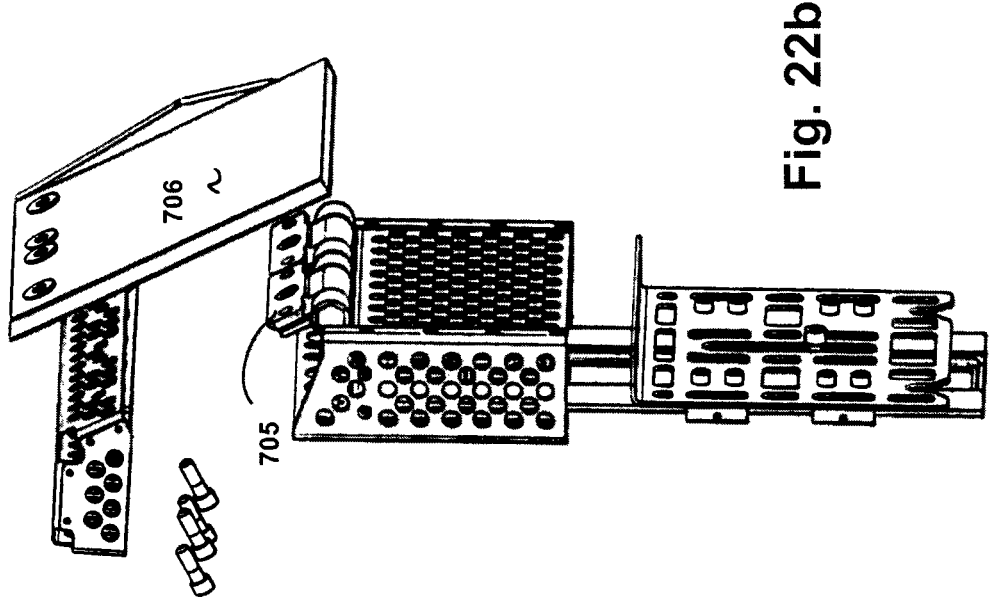
FIGS. 22a and 22b show exploded views of the system for adjusting rotation of the resting surface of the headrest and the associated system of friction blocks for the upward/downward movement.
Figure 22A:
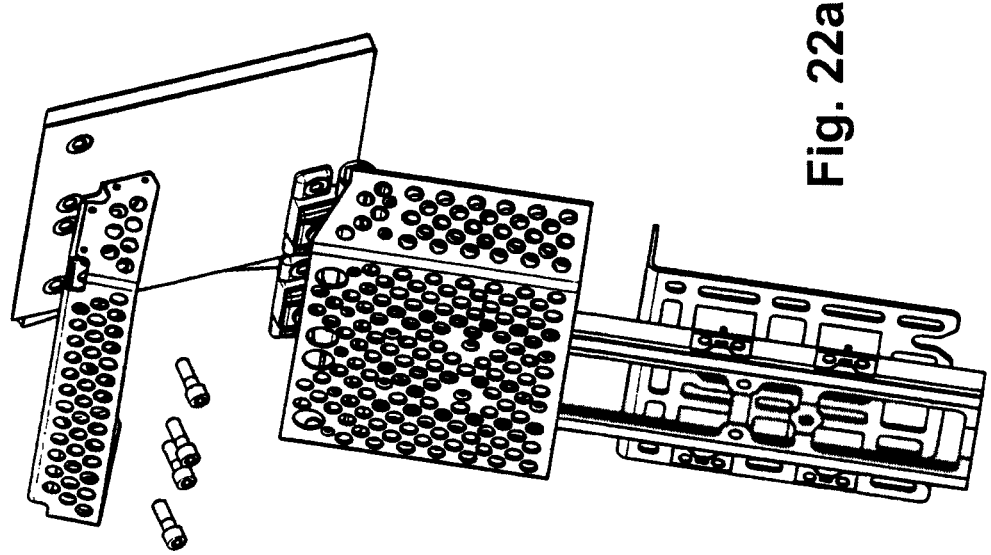

With particular reference to FIGS. 21 and 22, the headrest 700 advantageously comprises a part 701 for resting the passenger's head and a part 702 for performing fixing to the backrest 400. For the continuous movement of the part 701, the headrest is preferably provided with guides 703, the up/down movement of which is braked by means of adjustable friction blocks 704, known per se. Friction hinges 705 are used for the rotational movement of the resting surface 706.

Figure 23:
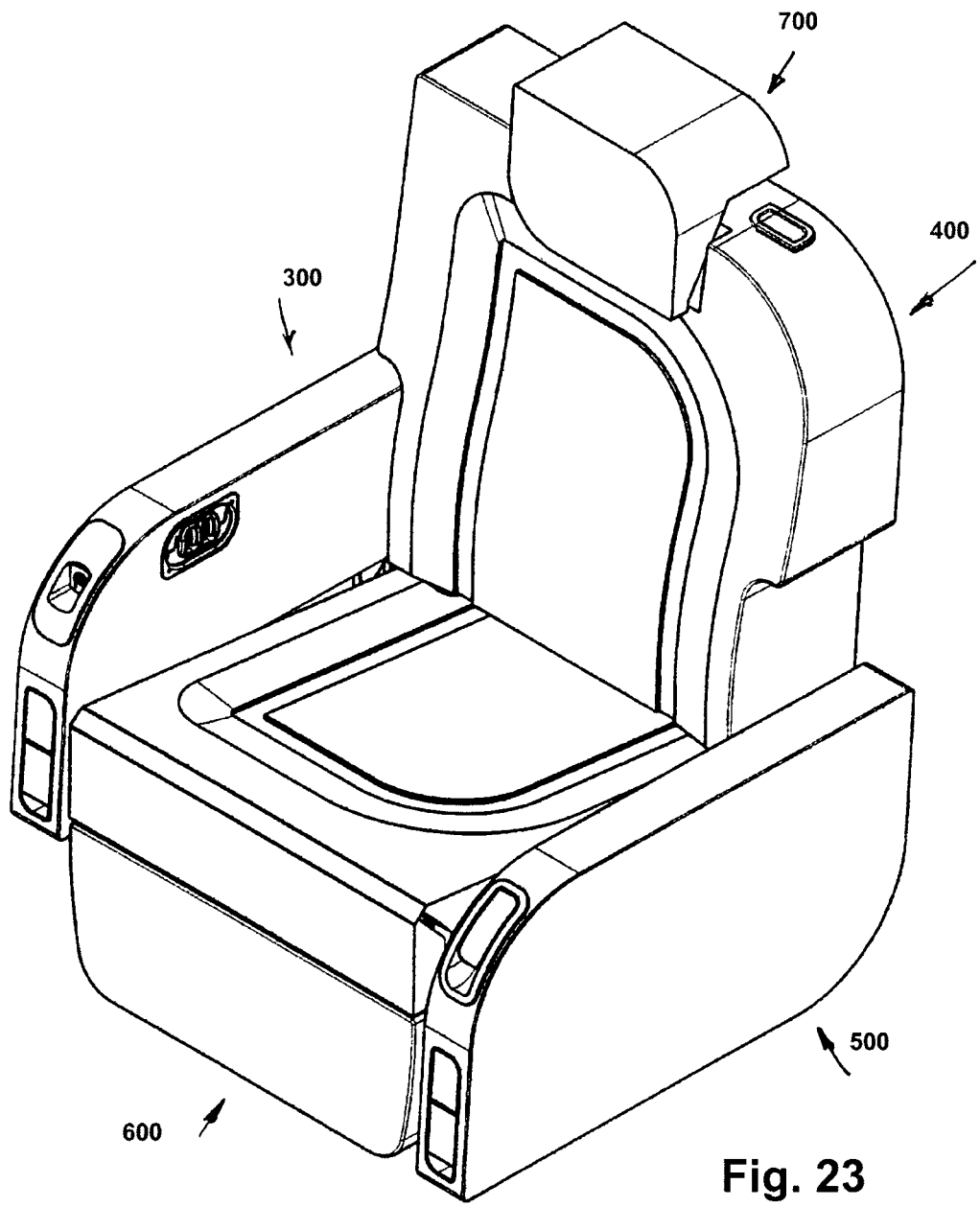
FIG. 23 is an overall view of the chair complete with padding and lining in the sitting position, with the arm rest lowered.

Finally, FIGS. 23 and 24 show the chair in its entirety, complete with padding and lining, which in the extended position assumes practically the dimensions of a single bed.

The parts which make up the chair according to the invention result in a chair structure which is strong and flexible, owing to the presence of the hinged joints. The chair is also easy to maintain and quick to assemble.

Compared to the prior art, a configuration where the leg rest 600 is fastened to the front of the seat 300 by means of levers and pins and is independent of the movement of the backrest increases the comfort of the passenger, giving him/her the possibility of moving separately the various parts of the chair as required.

Another advantage compared to the prior art consists in the fact that the movement of the backrest of the chair according to the invention is independent of the extension of the leg rest and the movement of the arm rests; moreover, each movement of the individual parts can be adjusted to the desired extended positions directly by the passenger. This helps increase the comfort and usable space during flying hours. In addition the arm rests can be completely lowered in order to increase the usable space and comfort, making it easier to get up from and sit down on the chair.

A further advantage compared to the prior art consists in the fact that the rotational pin (backrest/seat pivot) 316 is fastened to a structure (frame 300A) supporting the seat structure 300B and the pins 306 and 318 slide inside guides 320, 321 which are located on the side support structures of the movable seat frame 311. Moreover, an advantage of the system for reclining the backrest according to the invention consists in the fact that it does not require a rack, and the entire system of levers, guides and frame pins is therefore simplified, lighter and at the same time more efficient and comfortable, principally because a simple mechanical actuator, and not an electromechanical actuator, is required to move the chair on a rack.

Compared to the prior art, moreover, the bed position is assumed by means of the sole extending and rotational movement of the leg rest 600 and by means of a downwards rotational movement of the backrest 400 (independent of the leg rest), which operates the seat 300B (again by means of pins 316 and levers 410 or 410a), moving it forwards and upwards by means of the pins 306, 318 and the guides 320 and 321. All of this occurs without any necessary movement of the support structure or frame 300A which is moved only as required by the passenger by means of operation of levers such as 103.

By separating the backrest and seat, which is performed by removing the pins 407 or 411 and the brake lever 410b (FIG. 6), it is possible to remove the entire movable structure of the seat 300B, including the leg rest 600 which is fixed to it at the front, in order to access the anchoring structure 200 for maintenance purposes. This is a very important aspect for airline companies since it involves a reduction in maintenance time and therefore associated management costs.

Moreover, by having guides 320, 321 positioned on the seat side support structures 311, the arm rests 500 can be moved without being linked at all to the guides 320 and 321 of the movable structure 300B and in addition without danger for the passenger during the associated movements, something which, instead, is impossible with the chairs of the prior art. Moreover, owing to the arrangement of the rotational pins 318 fixed to the frame side support structures 301 and not to the movable structure 300B, the arm rests 500 have their own movement which is separate from any movement of the seat, backrest or leg rest components of the chair, which may be moved independently of each other.

Differently from the prior art, the movement of the chair forwards/backwards and rotation thereof is performed entirely independently of the bed position.

In addition, the chair according to the invention is designed so that it is possible to control the movement of the backrest and the seat, fastened thereto, in a gradual and braked manner, from the vertical position into the bed position, owing to the use of a mechanical actuator 310 or 310' and/or a balancing brake system 410c, which is not indispensable, being operated at the same time as the mechanical actuator by means of the controls 102. All of this allows the passenger to move the backrest into the bed position or from the bed position into the vertical position, by means of levers 410 or 410a and 410b and rotational pins 316 and 407 or 411 which fasten brake and actuator to the backrest.

Lastly, no assistance is required on the part of the passenger in order to reposition the backrest 400 in the vertical position since the said actuator and aforementioned lever system are able to overcome the inertia of any dead-centre positions.

Figure 18:
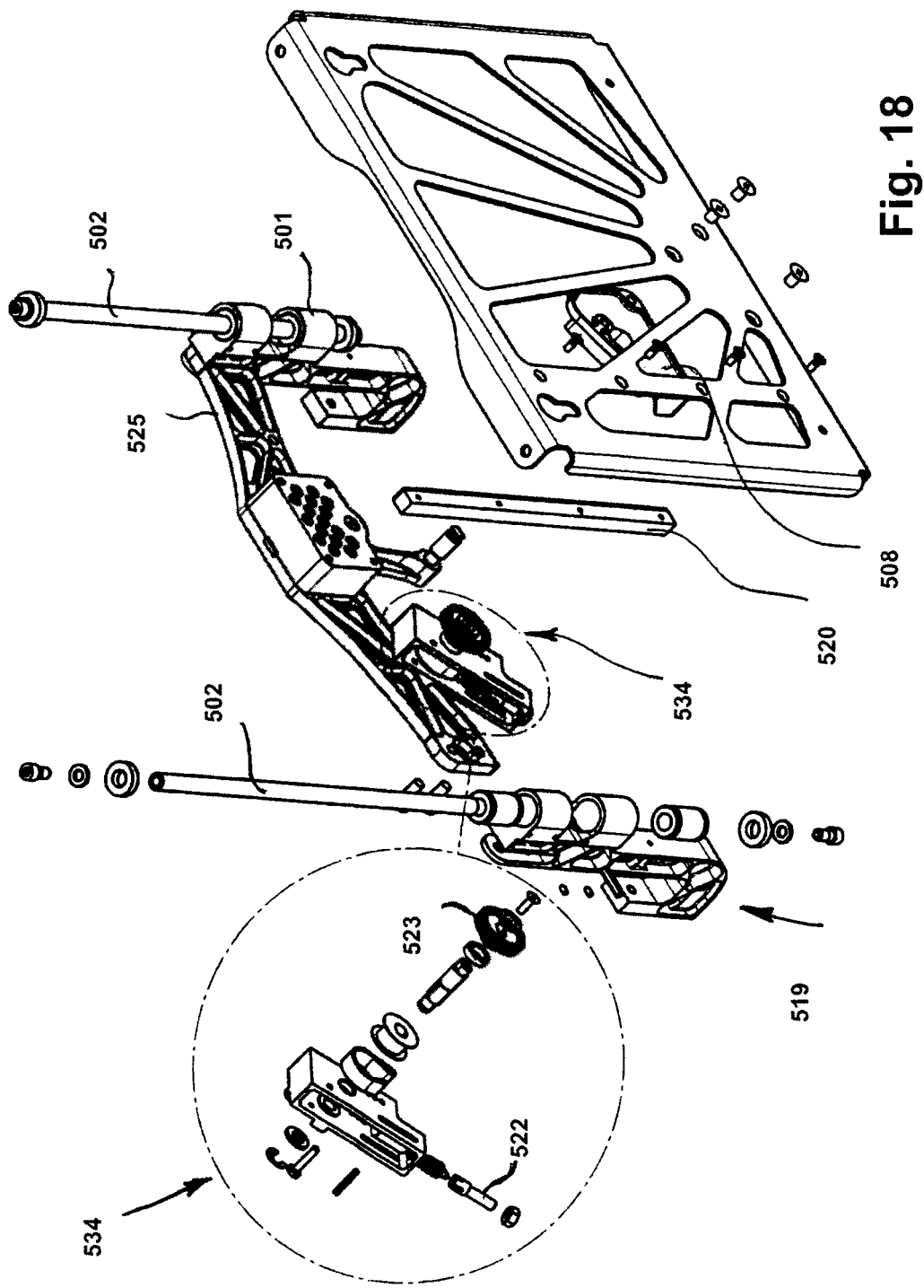
FIG. 18 is an exploded view of an alternative embodiment of the mechanical release system of the arm rest together with the associated friction sliding system.

Differently from the prior art, the arm rests 500 do not fall freely, but are braked so as to ensure downwards sliding with a gradual and adjustable movement. This constitutes an innovation compared to the prior art. In particular, the braking action, in an alternative embodiment, shown in FIG. 18, is achieved by means of a toothed guide 520 which works with a system adjustable by means of a screw 522 on a toothed wheel 523, as indicated in the detail 534 of FIG. 18. Moreover, in the labyrinth system shown in FIGS. 17 and 18, the device 503 oscillates inside the labyrinth block 508 instead of having a vertical sliding pin, unlike the devices of the prior art. The advantage of this embodiment consists in the fact that this oscillating system does not require axial centring or adjustment.

Moreover, the arm rest release system consists of an assembly 519 with components 508 and 534 which, owing to downwards positioning of the support brackets 519, 525 and 524, leaves the entire central area of the arm rest free from additional parts, allowing it to be used for storing internally additional items useful for the passenger, such as a video support arm or meal table.

The illustrations in the figures are merely exemplary and must not be understood as limiting the scope of the invention. A person skilled in the art may make any variations or modifications which however do not depart from the spirit and scope of the invention. It is understood that these variations and modifications are included within the scope of the description and the claims.

The invention claimed is:

1. A reclining chair (100) comprising:
  (a) an anchoring structure (200), and
  (b) a movable seat (300),
  wherein the movable seat (300) is mounted on the anchoring structure, and the movable seat (300) comprises:
    a frame (300A) comprising two frame side support structures (301) which have front shoulders (302) and rear shoulders (303) provided with respective frame pins (316 or 316a), and the two frame side support structures (301) are connected together by front transverse bars (304a and 305),
    a movable leg rest (600), wherein the movable leg rest is capable of having a fully raised position,
    two movable arm rests (500), wherein the movable arm rests are capable of having a fully lowered position,
    a movable backrest (400) comprising a framework (401), and the framework is rotably connected at a bottom to a frame pin (316), which connects the framework of the movable backrest (400) to the frame (300A), wherein the movable backrest (400) is capable of having a fully reclined position,
    an adjustable head rest (700),
    a movable seat structure (300B) comprising rollers (306 and 318) in recesses (320 and 321) such that the rollers can slide in the recesses to make the movable seat structure (300B) movable,
    a plurality of lever systems comprising a first lever system (410), a second lever system (410a) and a third lever system (410b),
    frame pins (316 or 316a), quick-release aeronautical pins (323) and fastening pins (411),
    a front bar (312a) and a rear bar (312b),
    a plurality of actuators comprising: a first actuator (309, 309') and a second actuator (310, 310'),
  wherein:
    the movable backrest (400), the movable leg rest (600) and the movable arm rests (500) are independently operably connected to the first actuator (309 or 309') and the second actuator (310 or 310') such that they are capable of moving independently and in opposition to each other for the coordinated movement of the movable seat structure (300B), the movable leg rest (600) and the movable backrest (400),
  wherein the first actuator (309 or 309') is connected at the front to the end of the leg rest close to the front bar (312a) and at the rear to the rear bar (312b), both the front bar (312a) and the rear bar (312b) form part of the movable seat structure (300B) for movement of the movable leg rest (600), and
  (i) the second actuator (310) is connected at the rear to the rear bar (312b) of the movable seat structure (300B) and at the front to the front transverse bar (305) of the frame (300A),
    and the second actuator (310) in combination with the first lever system (410) and frame pins (316) connect together the movable backrest (400) and the frame (300A) to assist and coordinate the movement of the movable seat (300) with respect to the movable backrest (400), or
  (ii) the second actuator (310') is frontally connected to the front of the frame (300A) and at the rear to the movable backrest (400), the connection to the movable backrest (400) being performed by means of fastening pins (411) positioned on a support bracket (407a) fixed to the movable backrest (400),
    and the second actuator (310') in combination with the second lever system (410a) and the third lever system (410b), frame pins (316) and fastening pins (411) assist and coordinate the movement of the movable seat (300) with respect to the movable backrest (400), the movable backrest (400), when fully reclined, and the two movable arm rests (500), when fully lowered, and the movable leg rest (600), when fully raised, form together with the movable seat structure (300B) and the adjustable head rest (700), a substantially flat surface, the frame (300A) forms a support for the movable seat structure (300B) and the movable backrest (400), the movable seat structure (300B) is connected to the movable leg rest (600), the frame (300A) is connected laterally to the two arm rests (500) and posteriorly to the movable backrest (400), the movable backrest (400) is connected to the frame (300A) with the frame pins (316), the movable backrest (400) is movably connected to the movable seat structure (300B) with the first, second and third lever systems (410, 410a and 410b), the first, second and third lever systems (410, 410a and 410b) are connected at one end to the movable seat structure (300B) and the framework (401) of the movable backrest (400) and at the other end to quick-release aeronautical pins (323) arranged in slots on seat side movable support structures (311) of the movable seat structure (300B);

the rollers (306 and 318) connecting the frame (300A) and the movable seat structure (300B) are located on the frame side support structures (301) of the frame (300A) and slide inside corresponding recesses (320 and 321) formed in the seat side movable support structures (311) of the movable seat structure (300B), and the second actuator (310') is operably connected to a balancing brake system (410c), and movement of the second actuator (310') is assisted by operation of a balancing brake connected to the movable backrest (400), wherein the second actuator (310') is joined to the movable backrest (400) via the fastening pins (411) and is connected at the front to the frame side support structure 301 of the frame 300A, and the third lever system (410b): can move the movable seat structure (300B), the second actuator (310') and the balancing brake; or, can move the movable seat structure (300B) and the second actuator or the balancing brake, at the same time as it can move the movable backrest (400).

2. The reclining chair of claim 1, wherein the second and third lever systems (410a and 410b) comprise the balancing brake system (410c) connected at one end to the movable seat structure (300B) and at the other end inside the seat structure (323).

3. The reclining chair of claim 1, wherein:
(a) the anchoring structure (200) comprises adjustable track fitting systems (209a and 209b) and longitudinal bars 203 and 204); and positioning bars (201 and 202), the longitudinal bars (203 and 204) parallel to each other, and the positioning bars (201 and 202) parallel to each other, or
(b) the anchoring structure (200) comprises adjustable track fitting systems (209a and 209b), longitudinal bars (203 and 204) and positioning bars (201 and 202), wherein the adjustable track fitting systems (209a and 209b) connected directly to the longitudinal bars (203 and 204).

4. The reclining chair of claim 3, wherein the positioning bars (201 and 202) comprise longitudinal eyelets (207a and 207b) inside which corresponding collars (208a and 208b) slide.

5. The reclining chair of claim 4, wherein the collars (208a and 208b) are hingeably connected to the adjustable track fitting systems (209a and 209b).

6. The reclining chair of claim 4, wherein the adjustable track fitting systems (209a and 209b) are connected directly to the longitudinal bars (203 and 204).

7. The reclining chair of claim 4, wherein the anchoring structure (200) comprises centrally a rotating element (212) fixed to the longitudinal bars (203 and 204) and to the frame (300A), with adjustable rotational degrees of the frame (300A).

8. The reclining chair of claim 3, wherein the adjustable track fitting systems (209a and 209b) are slidably adaptable to different types of rails.

9. The reclining chair of claim 3, wherein the adjustable track fitting systems (209a and 209b) are adjustable horizontally.

10. The reclining chair of claim 1, wherein: the first actuator (309 or 309') and the second actuator (310 or 310') are mechanical actuators, hydraulic actuators, or jacks; the first actuator (309 or 309') is a mechanical actuator, a hydraulic actuator, or a jack; or, the second actuator (310 or 310') is a mechanical actuator, a hydraulic actuator, or a jack.

11. The reclining chair of claim 1, wherein the two frame side support structures (301) are connected together by both front transverse bars (304a and 305) and by a rear transverse bar (304b),
wherein one of the front transverse bars (304a) and the rear transverse bar (304b) support respective sliding sleeves (314a and 314b), and the sliding sleeves (314a and 314b) support at least one bar (315) perpendicular to the front transverse bar (304a) and the rear transverse bar (304b),
the at least one bar (315) being in turn slidably supported by at least one sleeve (317) in turn rigidly connected to a rotating element (212), all of which so as to allow a transverse and longitudinal and rotational displacement of the frame (300A) with respect to the anchoring structure (200) and a rotation about a vertical axis.

12. The reclining chair of claim 1, further comprising a lap belt and a lap belt attachment point.

13. The reclining chair of claim 1, wherein the movable backrest (400) supports the adjustable headrest (700) provided with guides (703) and friction devices (704) for continuous upward/downward adjustment thereof and a resting surface (706) with corresponding friction hinges (705) for adjusting its rotation.

14. The reclining chair of claim 1, further comprising a safety belt, two safety belt attachment points positioned on frame pins (316a) of the frame (300A) and a third attachment point (406) of which is positioned on a bar (402) of the movable backrest (400).

15. The reclining chair of claim 1, wherein the frame side support structures (301) comprise receiving slots (319) for connection to an attachment mechanism (519) for each arm rest (500), wherein the attachment mechanism (519) connects to the receiving slots (319) provided on the frame side support structures (301), and each arm rest (500) comprises a friction-type release system (501) sliding on guides (502), the engaged and released positions of the friction-type release system (501) achieved by using a torsion spring (507), which allows a first device (503) and a pin (504) to rotate and move inside a second device (508) so that the arm rests (500) are able to move downwards into the "fully down" position;
and optionally the second device (508) is of the labyrinth type with flat inclined surfaces.

16. The reclining chair of claim 1, wherein the movable seat structure (300B) is positioned such that the arm rests (500) can be lowered to the level of the movable seat structure (300B), and the seat is connected by levers to the movable backrest (400) such that when the movable backrest (400) is moved back to a reclining position by the first actuator (309 or 309') or the second actuator (310 or 310'), the movable seat structure (300B) is moved or advanced forward.

17. The reclining chair of claim 1, wherein the arm rest (500) further comprises controls (101 and 102) for operating the first actuator (309 or 309') and the second actuator (310 or 310') and a balancing brake system (410c) for performing the movement of the movable backrest (400) and the movable seat (300) or the movable seat structure (300B) and for raising and extending the movable leg rest (600),
wherein the controls (101) controlling rotation and transverse and longitudinal displacement of the chair.

18. The reclining chair of claim 1, further comprising sliding guides (610), wherein the movable leg rest (600) is extendable along the sliding guides (610), and the sliding guides (610) are inserted inside arms (601) engaged with the front bar (312a) of the movable seat structure (300B), and the sliding guides (610) can be raised level with the seat structure (300B) by the first actuator (309 and 309') operated by controls (102).

19. The reclining chair of claim 1, further comprising an object storage compartment (603); and optionally the object storage compartment (603) has contained therein an oxygen mask or a life jacket.

20. The reclining chair of claim 1, wherein the anchoring structure (200) comprises hinged attachment points for the attachment of the anchoring structure (200) and the movable seat structure (300B).

21. The reclining chair of claim 1, wherein the anchoring structure (200) comprises support feet formed so as to allow positioning of the reclining chair on surfaces which are not flat or on rails of different widths by sliding of the feet on unaligned rails.

22. The reclining chair of claim 1, wherein the movable arm rests (500) further comprise friction bearings to prevent the movable arm rests (500) from falling freely when released for lowering.

23. The reclining chair of claim 1, wherein the movable arm rests (500) further comprise a control mechanism for rotating, moving forwards or moving backwards or moving to the right and left the entire structure of the reclining chair; and optionally the control mechanism is a lever or a push button type control mechanism.

24. The reclining chair of claim 1, wherein the rollers (306 and 318) are mounted on the frame (300A) and slide inside the seat side movable support structures (311) of the movable seat structure (300B), and the rollers (306 and 318) are movable inside a recess (320) and a cavity (321).

* * * * *